United States Patent
Kozuma et al.

(10) Patent No.: US 8,487,745 B2
(45) Date of Patent: Jul. 16, 2013

(54) SEMICONDUCTOR DEVICE

(75) Inventors: Munehiro Kozuma, Kanagawa (JP); Yoshiyuki Kurokawa, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 631 days.

(21) Appl. No.: 11/948,602

(22) Filed: Nov. 30, 2007

(65) Prior Publication Data

US 2008/0136604 A1 Jun. 12, 2008

(30) Foreign Application Priority Data

Dec. 7, 2006 (JP) .................................. 2006-330177

(51) Int. Cl.
*H04Q 5/22* (2006.01)

(52) U.S. Cl.
USPC .................. 340/10.1; 340/10.51; 365/203

(58) Field of Classification Search
USPC ........... 340/572.1, 572.4, 572.7, 10.1, 10.4, 340/10.51; 235/375, 385, 492; 257/368–413; 365/149, 189.011, 192, 203, 208, 189.01
See application file for complete search history.

(56) References Cited

U.S. PATENT DOCUMENTS

| | | | |
|---|---|---|---|
| 4,792,996 A | 12/1988 | Oyama | |
| 6,478,679 B1 | 11/2002 | Himoto et al. | |
| 6,549,064 B2 | 4/2003 | Bandy et al. | |
| 6,786,826 B2 | 9/2004 | Himoto et al. | |
| 6,914,447 B2 | 7/2005 | Baumann | |
| 7,081,635 B2 | 7/2006 | Baumann | |
| 7,130,234 B2* | 10/2006 | Shionoiri et al. | 365/203 |
| 7,142,117 B2* | 11/2006 | Watanabe | 340/572.1 |
| 7,217,654 B2 | 5/2007 | Nagahara et al. | |
| 7,332,815 B2* | 2/2008 | Shionoiri et al. | 257/773 |
| 7,348,875 B2* | 3/2008 | Hughes et al. | 340/10.4 |
| 7,430,146 B2 | 9/2008 | Shionoiri et al. | |
| 7,710,240 B2 | 5/2010 | Kang et al. | |
| 7,881,693 B2 | 2/2011 | Kurokawa | |
| 2004/0212388 A1 | 10/2004 | Baumann | |
| 2004/0227002 A1 | 11/2004 | Watanabe | |
| 2005/0052283 A1 | 3/2005 | Collins et al. | |
| 2005/0128827 A1 | 6/2005 | Shionoiri et al. | |
| 2005/0134463 A1 | 6/2005 | Yamazaki | |
| 2005/0186904 A1 | 8/2005 | Kowalski et al. | |
| 2005/0254183 A1 | 11/2005 | Ishida et al. | |

(Continued)

FOREIGN PATENT DOCUMENTS

| | | |
|---|---|---|
| CN | 1627442 A | 6/2005 |
| EP | 0 217 654 A2 | 4/1987 |

(Continued)

OTHER PUBLICATIONS

Office Action, Chinese Application No. 200710198928.5, dated Feb. 23, 2011, 17 pages with English translation.

*Primary Examiner* — Thomas Mullen
(74) *Attorney, Agent, or Firm* — Fish & Richardson P.C.

(57) ABSTRACT

Communication performance of the wireless tag is improved by providing an SRAM provided with an RF battery in the wireless tag provided with a CPU to speed up the CPU system. Moreover, rewriting of data in a memory of a wireless tag provided with a CPU is enabled. An RF battery includes an antenna circuit, a power supply portion, and a power storage device. A function as a non-volatile memory is provided to an SRAM by combining the SRAM and an RF battery.

36 Claims, 11 Drawing Sheets

U.S. PATENT DOCUMENTS

| | | |
|---|---|---|
| 2008/0214132 A1 | 9/2008 | Kurokawa |
| 2009/0230988 A1 | 9/2009 | Nieuwland et al. |
| 2010/0019907 A1 | 1/2010 | Shanks |
| 2010/0096181 A1 | 4/2010 | Nakamura et al. |

FOREIGN PATENT DOCUMENTS

| | | |
|---|---|---|
| EP | 0 971 311 A1 | 1/2000 |
| JP | 57-032144 A | 2/1982 |
| JP | 62-074189 A | 4/1987 |
| JP | 02-058191 A | 2/1990 |
| JP | H2-104421 A | 8/1990 |
| JP | 04-096891 A | 3/1992 |
| JP | 06-096301 A | 4/1994 |
| JP | 07-057067 | 3/1995 |
| JP | 10-307898 | 11/1998 |
| JP | 2001-005928 A | 1/2001 |
| JP | 2003-070187 | 3/2003 |
| JP | 2003070187 A | 3/2003 |
| JP | 2005-191961 A | 7/2005 |
| JP | 2005-202947 | 7/2005 |
| JP | 2005-354888 | 12/2005 |
| JP | 2006-004015 | 1/2006 |
| WO | 99/08231 A1 | 2/1999 |

* cited by examiner

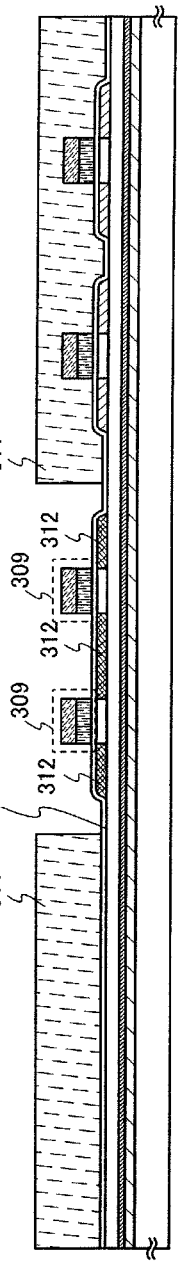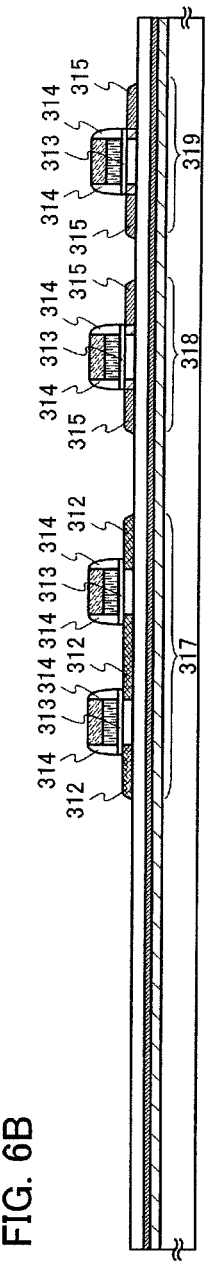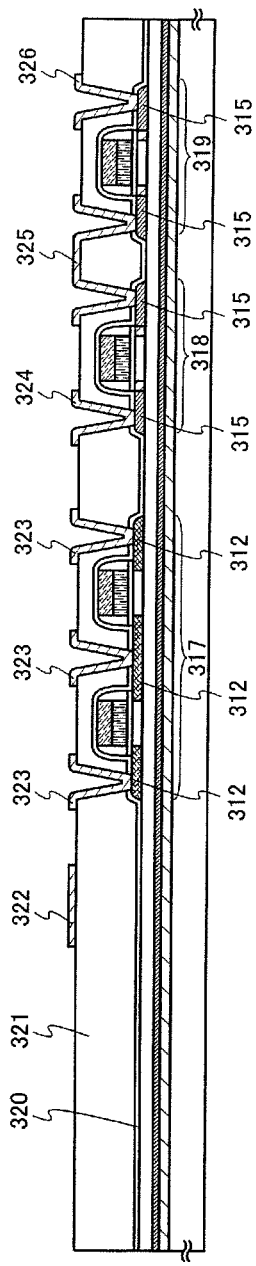

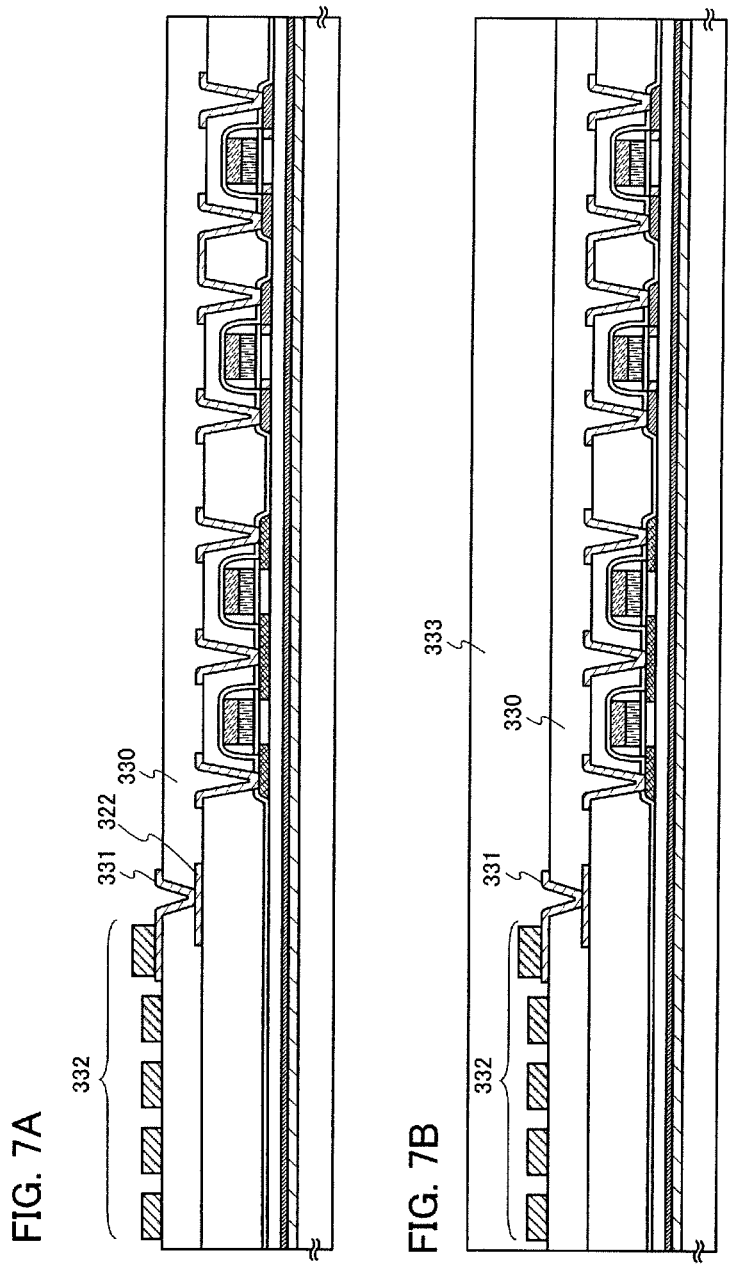

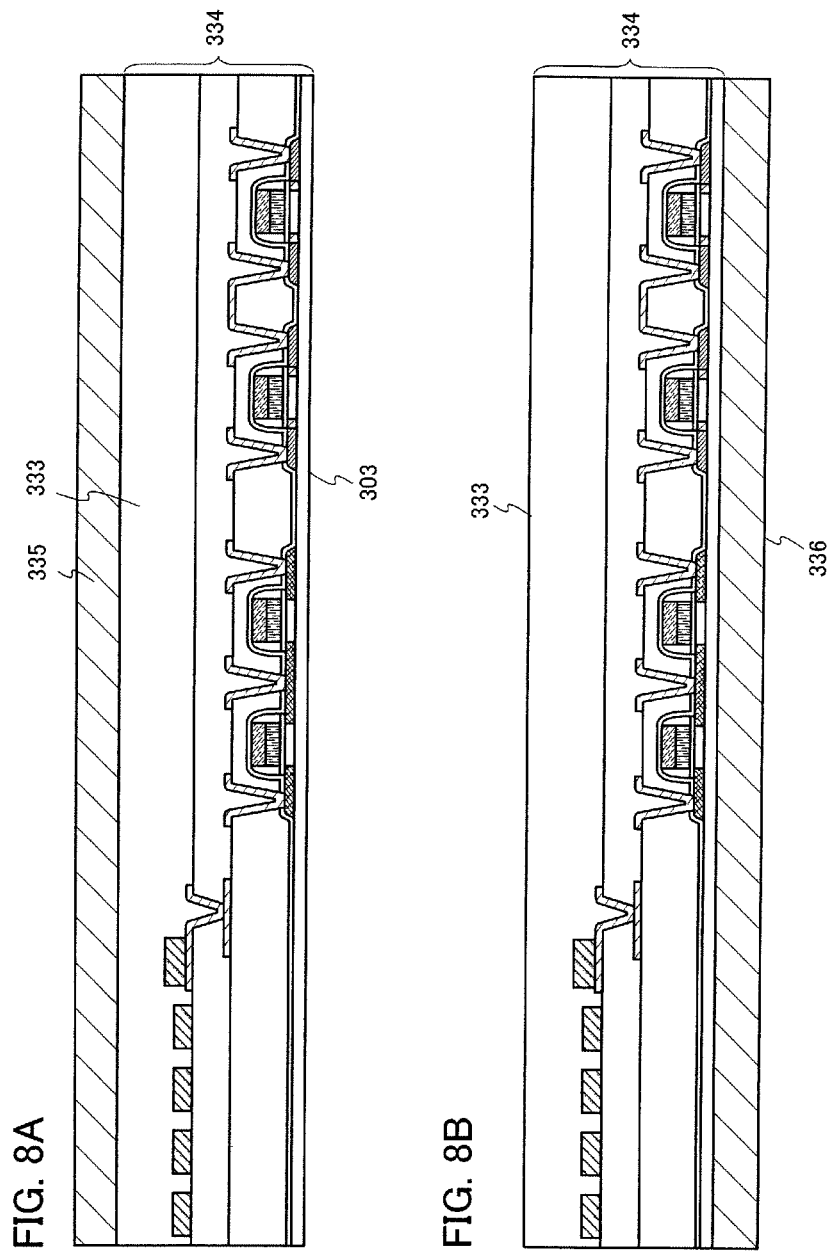

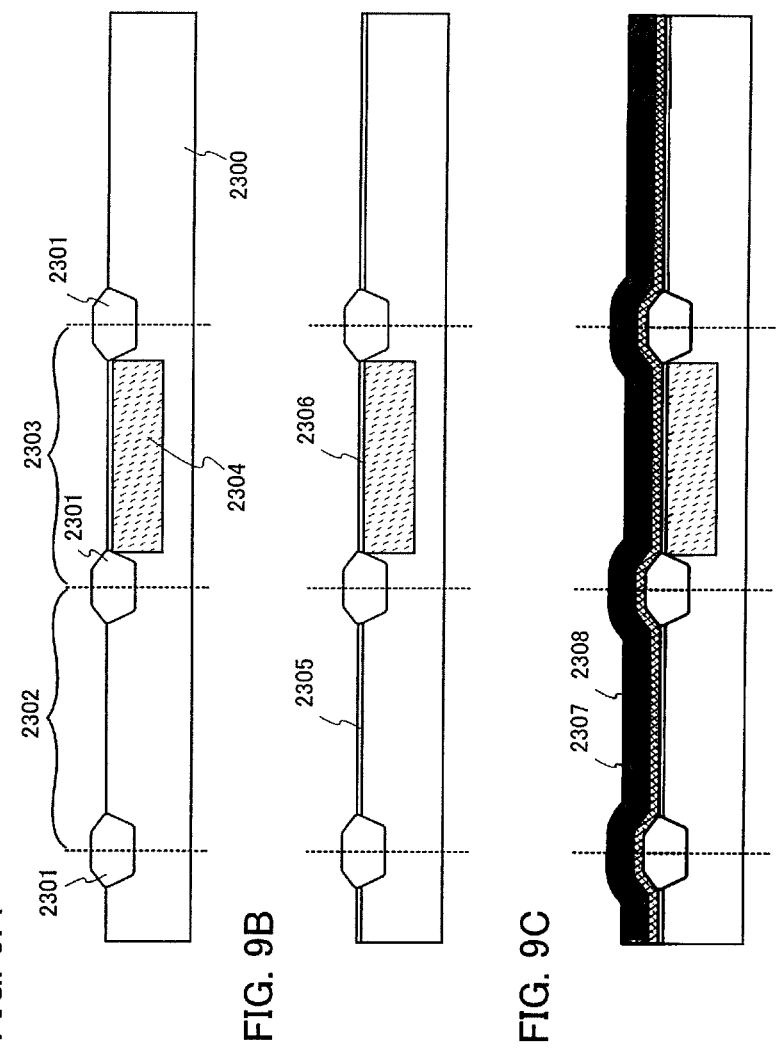

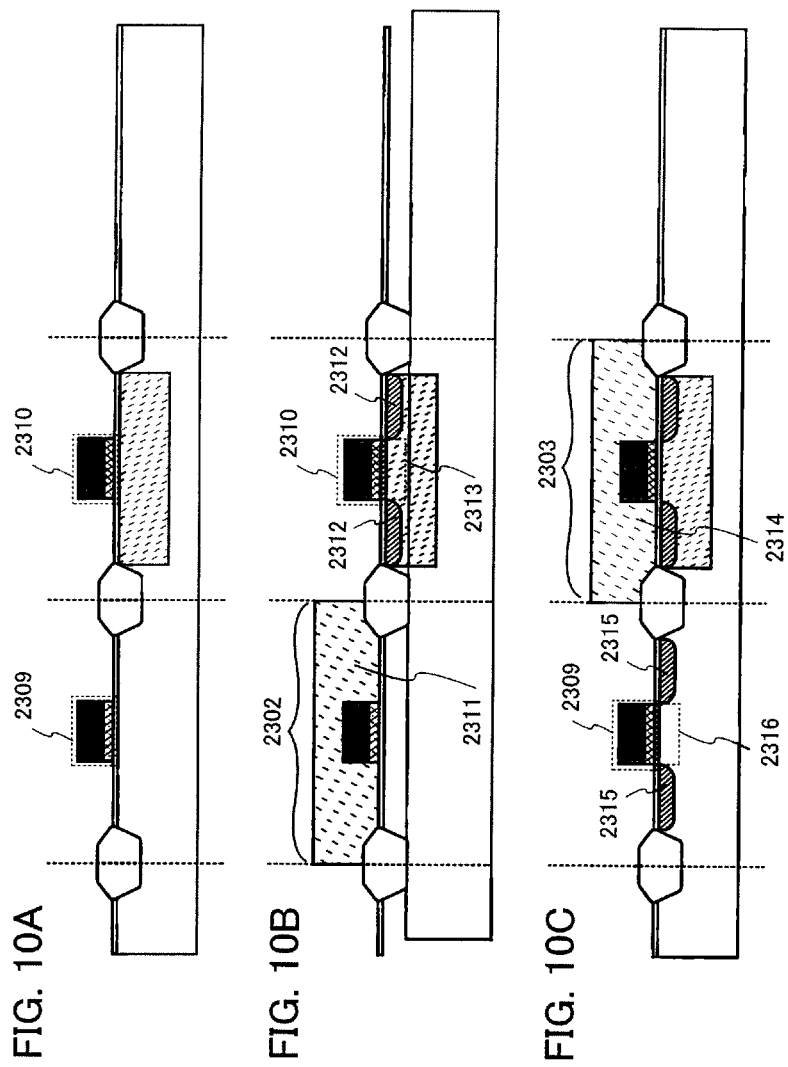

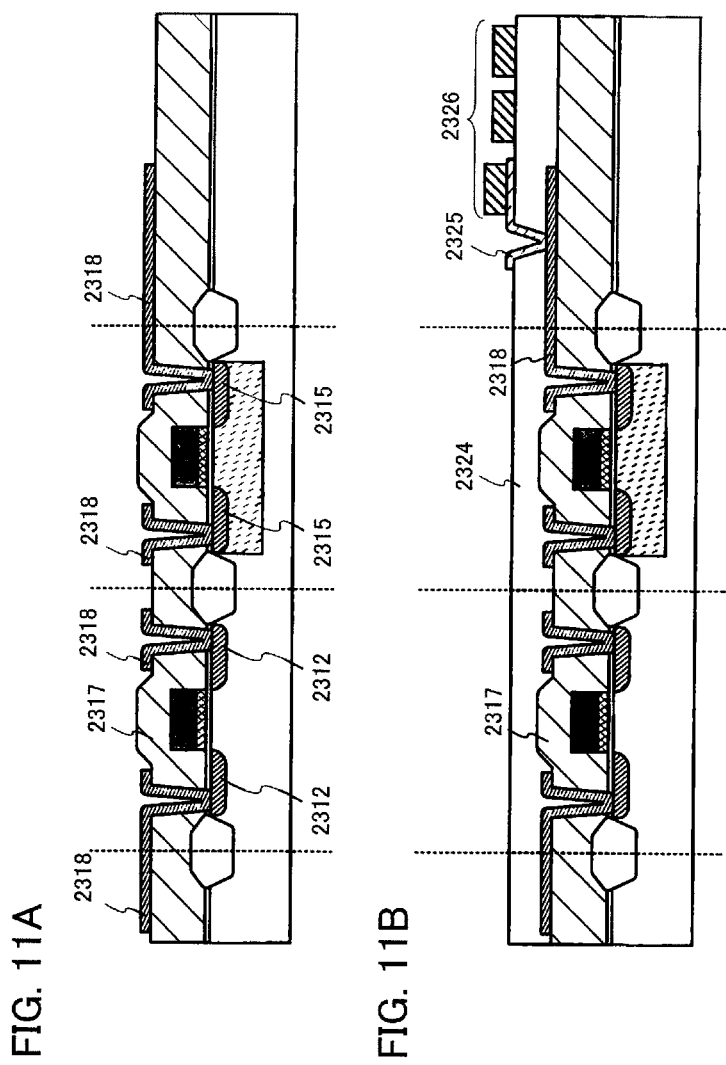

SEMICONDUCTOR DEVICE

BACKGROUND OF THE INVENTION

1. Field of the Invention

The present invention relates to a semiconductor device for wireless communication. In particular, the present invention relates to a semiconductor device for wireless communication provided with a CPU (central processing unit).

2. Description of the Related Art

Recently a small-sized semiconductor device (a wireless tag) combining an ultra small IC chip and an antenna circuit for wireless communication has attracted a lot of attention. The wireless tag can read and write data by transmitting and receiving communication signals, with a wireless communication device (hereinafter referred to as a reader/writer). Although the wireless tag often has a card form or a chip form which is much smaller than the card form, it may have various forms depending on use.

As a field of application of the wireless tag, for example, product management in distribution industry is an example. These days product management with a barcode or the like is common, however, data cannot be read when there is an interrupting object in front of a barcode attached to the product because data stored in the barcode is optically read. On the other hand, in wireless communication which reads data wirelessly, data can be read as long as radio waves get through an interrupting object. Therefore, an efficient merchandise management and a cost cut in product management are expected. In addition, the wireless tag is expected to have a broad range of applications such as the railway ticket, the air ticket, and an automatic payment system.

The wireless tag including a memory is mentioned in the patent document 1 (Japanese Published Patent Application No. 2005-202947).

At present, the wireless tag employs, for example, a mask ROM (read only memory) as a memory for storing program data. The mask ROM is advantageous in a production cost, reading speed, and storing data. However, since data cannot be rewritten a plurality of times, data inside of the memory basically cannot be changed so the use of the wireless tag is limited once it is manufactured. In order to solve a problem with a limitation of the number of rewriting data, a flash memory may be used as a memory medium included in the wireless tag. In the case where the flash memory is provided to the wireless tag, although data can be electrically rewritten and stored, low reading speed is a problem. In addition, the flash memory takes longer for writing time than reading time and takes several hundred milliseconds for erasing time. Therefore, the wireless tag using the flash memory is inferior to existing wireless tags in response time. Moreover, the flash memory has a complicated process which leads to a high production cost so it is very difficult to provide the flash memory to the wireless tag which should be produced at a low cost.

In a conventional CPU system using a DRAM (dynamic random access memory) included in a PC (personal computer), the DRAM, a main memory, stores program data saved in a mask ROM when the CPU system is started. Features of the DRAM are high integration degree and a low production cost. However, operation of the memory is slow due to refreshing operation in which data is rewritten at regular intervals. A reason why refreshing operation is required is that the DRAM stores data by using accumulated electricity and the accumulated electricity is decreased by leakage current.

SUMMARY OF THE INVENTION

In order to speed up operation of the CPU system, an SRAM (static random access memory) which is capable of operating at high speed and does not need refreshing operation is favorable to be used as a cache memory even though the integration degree of the SRAM is lower than that of DRAM. Especially, by storing program data, which is often referred to in operation of the CPU, not in the DRAM but in the SRAM, reading time is shortened to speed up operation of systems.

However, unlike the PC, the wireless tag is not constantly supplied with electricity and the power supply often stops. Therefore, quick response (starting, processing and the like of the system) while electricity is supplied is an important factor. In the case where the same system (DRAM+SRAM) as that of the PC is provided in the wireless tag, the system requires a certain period of starting time to operate stably after power supply. This is especially because data is read from the ROM and a frequently-used data is written to the DRAM and the SRAM. The wireless tag whose starting time is long and response is too slow is unsuitable for product management and the like. Therefore, providing a system included in the above-described PC to the wireless tag is not practical.

In the case where the response speed of the wireless tag is low, a normal response cannot be obtained unless the wireless tag is stopped during communication with the reader/writer or the wireless tag is moved at low speed. This is because a tag which is moved at a speed higher than a certain value cannot be recognized, and that is one of the factors which limits an application of the wireless tag. For broadening use of the wireless tag in various fields, rise of the response speed is an important object.

In view of the foregoing problem, an object of the present invention is to allow rewriting of data in a memory included in the wireless tag provided with the CPU and speedup the CPU system so that communication performance of the wireless tag is improved.

The present invention provides a wireless power storage unit (RF battery) configured to store electricity transmitted wirelessly and an SRAM in a semiconductor device provided with a CPU. By supplying power from the wireless power storage unit to the SRAM, the semiconductor device with upgraded communication performance by speedup of the CPU system is provided. The SRAM is superior to other memories in a high reading and writing speed, in low power consumption during a waiting time, and in that a cycle time and an access time are the same. With the above-described features, the SRAM plays an important role for speedup of a system of the semiconductor device provided with the CPU. In addition, since the SRAM is combined with the wireless power storage unit, data in the SRAM can be stored and the SRAM has the same function as the ROM.

The wireless power storage unit includes a power supply portion and a power storage device. The wireless power storage unit may also include an antenna circuit. The antenna circuit includes an antenna and a resonance circuit. A function of the antenna is to receive radio signals. In particular, although the antenna has a limitation in a receivable frequency band of the radio signals, the receivable frequency domain can be broadened by providing a plurality of antennas. The resonance circuit is a circuit configured to generate electromotive force in accordance with the received radio signals. The power supply portion includes a function configured to convert an AC signal obtained by the antenna circuit to a DC signal, and a control circuit configured to switch charging and discharging of the power storage device. The power storage device includes a capacitor or a battery which can store electricity.

The semiconductor device of the present invention enables speedup of memory operation by providing an SRAM having a wireless power storage unit in order to use the SRAM as a program memory and/or a data memory, so that high-speed operation of a CPU system can be achieved. In addition, no data is stored in the SRAM which has been just manufactured so program data corresponding to application of the semiconductor device can be stored. Further, application of the semiconductor device is not limited in the manufacturing process so that production cost can be cut by mass production.

BRIEF DESCRIPTION OF THE DRAWINGS

FIGS. 6A to 6C are diagrams showing a manufacturing method of a semiconductor device of the present invention.

FIGS. 7A and 7B are diagrams showing a manufacturing method of a semiconductor device of the present invention.

FIGS. 8A and 8B are diagrams showing a manufacturing method of a semiconductor device of the present invention.

FIGS. 9A to 9C are diagrams showing a manufacturing method of a semiconductor device of the present invention.

FIGS. 10A to 10C are diagrams showing a manufacturing method of a semiconductor device of the present invention.

FIGS. 11A and 11B are diagrams showing a manufacturing method of a semiconductor device of the present invention.

DETAILED DESCRIPTION OF THE INVENTION

Hereinafter, embodiment modes of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, the present invention is not construed as being limited to description of the embodiment mode and embodiments.

[Embodiment Mode 1]

When an SRAM provided with a wireless power storage unit is used as a memory for storing program data of a semiconductor device, program data can also be stored even when a power supply is off. Moreover, by using the SRAM, high-speed reading, writing, and erasing during memory access of a CPU can be achieved. Since writing and rewriting of program data is also possible, a semiconductor device provided with a CPU system in accordance with an application can be produced. Hereinafter, a structure and operation of the semiconductor device will be described.

Figure 1:
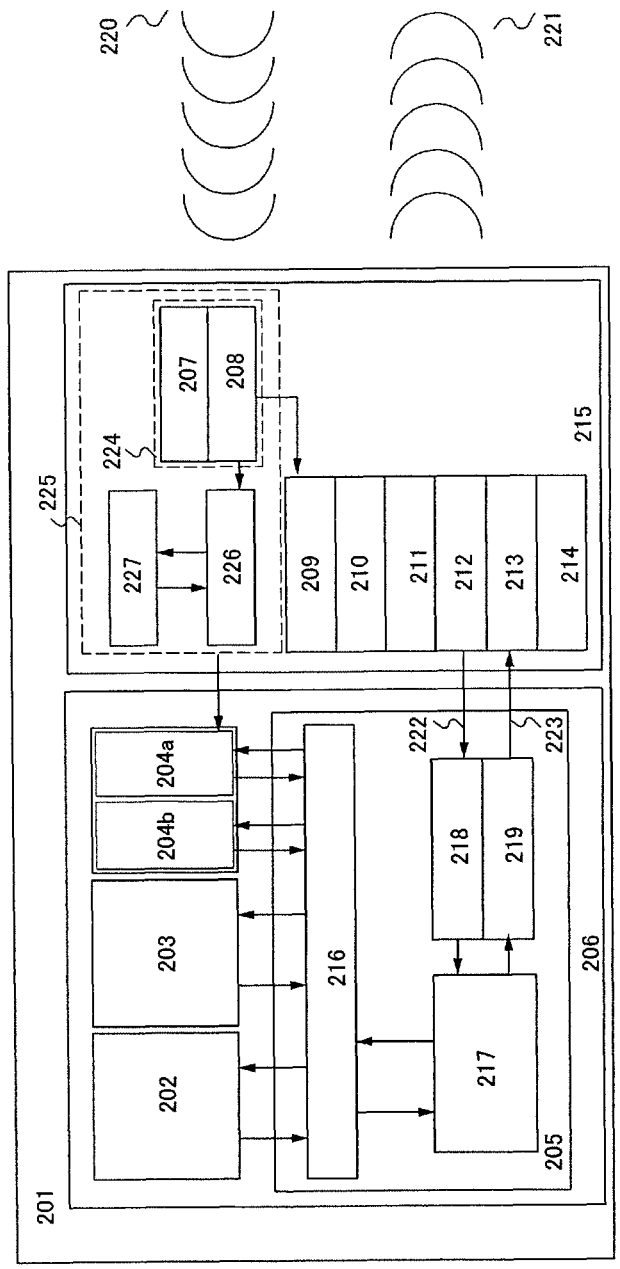
FIG. 1 is a block diagram showing a structure of a semiconductor device of the present invention.

FIG. 1 illustrates a block diagram of the semiconductor device.

As shown in FIG. 1, a semiconductor device 201 includes a logic portion 206, and an analog portion 215. The logic portion 206 includes a CPU 202, a mask ROM 203, an SRAM 204a, an SRAM 204b, and a controller 205. The analog portion 215 includes a power supply circuit 209, a reset circuit 210, a clock generation circuit 211, a demodulation circuit 212, a modulation circuit 213, a power supply management circuit 214, and a wireless power storage unit 225. The wireless power storage unit 225 15 includes an antenna circuit 224, a power supply portion 226, and a power storage device 227. The antenna circuit 224 includes an antenna 207 and a resonance circuit 208.

The SRAM 204a is supplied with electricity from the wireless power storage unit 225 and used for storing program data. Therefore, the power storage unit 225 functions as a power supply for storing data of the SRAM 204a. The SRAM 204b is used as a working memory for temporarily storing an arithmetic result and the like of the CPU 202.

The controller 205 includes a CPU interface (CPUIF) 216, a control register 217, a code extraction circuit 218, and an encoding circuit 219. Note that, in FIG. 1, communication signals are shown separately as a reception signal 220 and a transmission signal 221 for simplification; however, actually they constitute an integrated signal, and are transmitted and received at the same time between the semiconductor device 201 and a reader/writer. After the reception signal 220 is received by the antenna circuit 224, the reception signal 220 is demodulated by the demodulation circuit 212. The transmission signal 221 is modulated by the modulation circuit 213, and then transmitted from the antenna 207.

In FIG. 1, when the semiconductor device 201 is set in a magnetic field formed by the communication signals, an induced electromotive force is generated in the antenna circuit 224. The induced electromotive force is stored by an electric capacitance in the power supply circuit 209, which then stabilizes a potential of the induced electromotive force, and the induced electromagnetic force is supplied as a power supply voltage to each circuit in the semiconductor device 201. The reset circuit 210 generates an initial reset signal of the whole semiconductor device 201. For example, a signal that rises after the increase in the power supply voltage is generated as a reset signal. The clock generation circuit 211 changes a frequency and a duty ratio of a clock signal in accordance with a control signal generated by the power supply management circuit 214. The demodulation circuit 212 detects a change of an amplitude of the reception signal 220 of an ASK method as reception data 222 of "0"/"1". The demodulation circuit 212 corresponds to, for example, a low pass filter. The modulation circuit 213 transmits transmission data after changing the amplitude of the transmission signal 221 of an ASK method. For example, when transmission data 223 is "0", the point of resonance of the resonant circuit 208 is changed to change the amplitude of the communication signals. The power supply management circuit 214 monitors a power supply voltage supplied from the power supply circuit 209 to the logic portion 206 and the current consumption in the logic portion 206, and generates a control signal for changing the frequency and the duty ratio of the clock signal in the clock generation circuit 211.

In the wireless power storage unit 225, the induced electromotive force obtained in the resonance circuit 208 in accordance with the radio signals received by the antenna 207 is rectified by the power supply portion 226. The power supply portion 226 controls power storage and discharge of the power storage device 227. The power storage device 227 can store electricity and employ a so-called storage battery (battery). For example, a secondary battery such as a lithium-ion battery, a lithium secondary battery, a nickel hydride battery, a nickel-cadmium battery, an organic radical battery, a lead storage battery, an air secondary battery, a nickel-zinc battery, or a silver zinc battery can be applied. It is to be noted that, for the power storage device 227, in addition to the storage battery (battery), a capacitor with a large capacity (for example, a layered ceramic capacitor, an electric double layer capacitor, or the like) can be applied. In particular, since the charge and discharge capacity of a lithium-ion battery and that of a lithium secondary battery is large, the semiconductor device 201 in this embodiment mode of the present invention can be made to be small by applying the lithium-ion battery of the lithium secondary battery to the power storage device 227. In a metal lithium battery, the charge and discharge capacity can be increased by use of a transition metal oxide that contains lithium ions, a metal oxide, a metal sulfide, an iron-based compound, a conductive polymer, an organic sulfur-based compound, or the like for a positive electrode active material; use of lithium (an alloy) for a negative electrode active material; and use of an organic-based electrolyte solution, a polymer electrolyte, or the like for an electrolyte.

Next, operation of the semiconductor device in this embodiment mode will be described. Since no data is stored in the SRAM 204a included in the semiconductor device which has been just manufactured, program data for operating the CPU 202 should be written to the SRAM 204a. Writing and rewriting data to the SRAM 204a and a series of operation of the CPU 202 will be described below.

First, the reception signal 220 transmitted from the reader/writer is received by the semiconductor device 201. The reception signal 220 includes program data which is to be stored in the SRAM 204a. Note that, in FIG. 1, the communication signals are shown separately as the reception signal 220 and the transmission signal 221 for simplification; however, actually they constitute an integrated signal, and are transmitted and received at the same time between the semiconductor device 201 and the reader/writer. The reception signal 220 is demodulated in the demodulation circuit 212, decomposed into a control command, program data, and the like by the code extraction circuit 218, and stored in the control register 217. Here, the control command is data which specifies a response of the semiconductor device 201. For example, the control command specifies transmission of a unique ID number, operation stop, decryption, and the like.

Next, in the logic portion 206, the CPU 202 writes program data, which is received in accordance with program data for writing stored in the mask ROM 203, to the SRAM 204a. After that, the CPU 202 reads program data from the SRAM 204a and performs arithmetic processing. Arithmetic results and data under arithmetic processing are written to the SRAM 204b. The CPU 202 performs processing operation by receiving and transmitting data to/from the SRAM 204a and SRAM 204b.

The wireless power storage unit 225 functions as a power supply for storing program data written to the SRAM 204a. With power supply from the wireless power storage unit 225, the SRAM 204a can store data even when its power is off. Moreover, program data stored in the SRAM 204a is easily erased or rewritten by executing program data for erasing or rewriting which is stored in the SRAM 203.

Note that the CPU 202 accesses the mask ROM 203, the SRAM 204a, the SRAM 204b, and the control register 217 through the CPUIF 216. The CPUIF 216 has a function of generating an access signal for any of the mask ROM 203, the SRAM 204a, SRAM 204b, and the control register 217 based on an address required by the CPU 202.

At last, the encoding circuit 219 generates the transmission data 223 by the signal from the control register 217, and the transmission signal 221 is modulated in the modulation circuit 213, which is then transmitted to the reader/writer from the antenna 207.

As described above, no program data is stored in the SRAM in the manufacturing process of the semiconductor device so any program data corresponding to an application can be written to the SRAM 204a. Since there is no limitation of program data in an initial state of the semiconductor device, mass-production of the semiconductor devices is possible, so that production cost is reduced. By providing the SRAM, the CPU can directly read and write data to/from the SRAM even when and also immediately after the CPU system has been started, so that processing speed of the whole CPU system is improved.

It is to be noted that the SRAM 204a can be used not only as a program memory but also as a data memory.

By employing the above-described structure, the semiconductor device which is capable of rewriting data with improved response speed can be achieved.

[Embodiment Mode 2]

Figure 2:
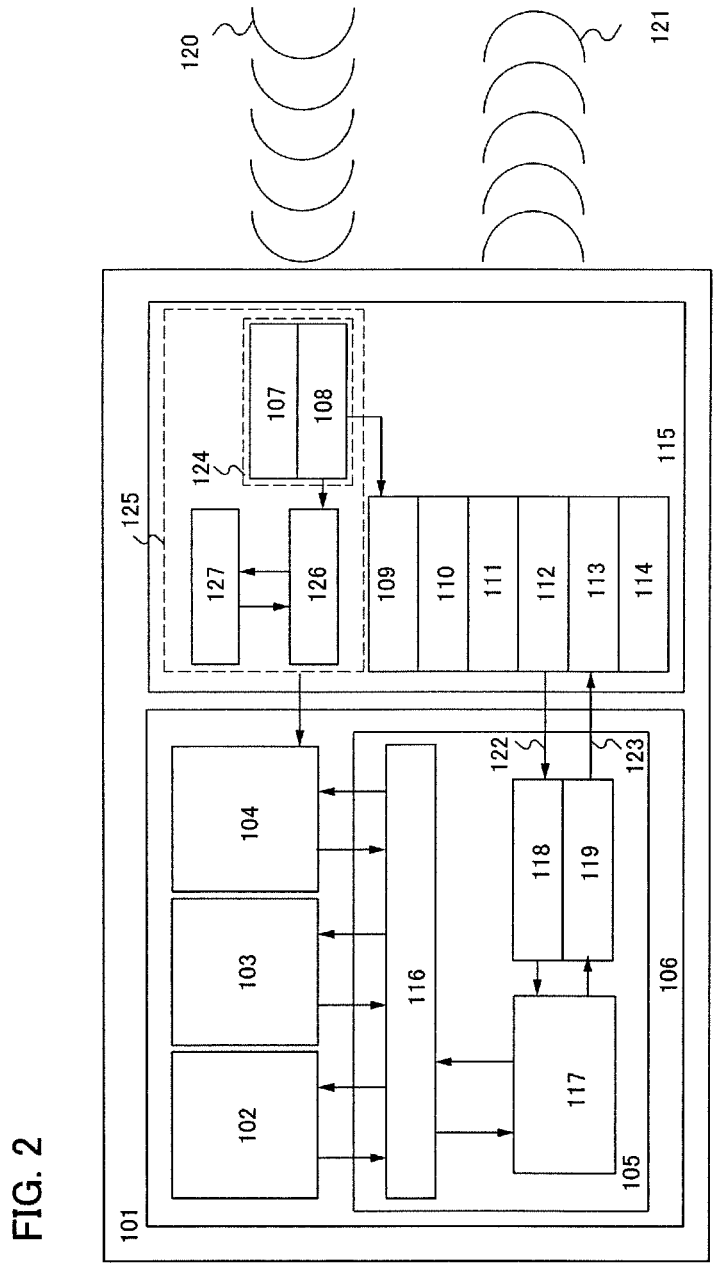
FIG. 2 is a block diagram showing a structure of a semiconductor device of the present invention.

In this embodiment mode, a semiconductor device including a CPU and an SRAM provided with a wireless power storage unit will be described. FIG. 2 illustrates a block diagram of the semiconductor device in this embodiment mode.

The block structure of the semiconductor device will be described with reference to FIG. 2. In FIG. 2, a semiconductor device 101 includes a logic portion 106 and an analog portion 115. The logic portion 106 includes a CPU 102, a mask ROM 103, an SRAM 104, and a controller 105. The analog portion 115 includes a power supply circuit 109, a reset circuit 110, a clock generation circuit 111, a demodulation circuit 112, a modulation circuit 113, a power supply management circuit 114, and a wireless power storage unit 125. The wireless power storage unit 125 includes a antenna circuit 124, a power supply portion 126, and a power storage device 127. The antenna circuit 124 includes an antenna 107 and a resonance circuit 108.

The controller 105 includes a CPU interface (CPUIF) 116, a control register 117, a code extraction circuit 118, and an encoding circuit 119. Note that, in FIG. 2, communication signals are shown separately as a reception signal 120 and a transmission signal 121 for simplification; however, actually they constitute an integrated signal, and are transmitted and received at the same time between the semiconductor device 101 and a reader/writer. After the reception signal 120 is received by the antenna circuit 124, the reception signal 120 is demodulated by the demodulation circuit 112. The transmission signal 121 is modulated by the modulation circuit 113, and then transmitted from the antenna 107.

In FIG. 2, when the semiconductor device 101 is placed in a magnetic field generated by the communication signals, an induced electromotive force is produced in the antenna circuit 124. The induced electromotive force is stored by an electric capacitance in the power supply circuit 109 which then stabilizes potential of the induced electromotive force, and is supplied as a power supply voltage to each circuit in the semiconductor device 101. The reset circuit 110 generates an initial reset signal of the whole semiconductor device 101. For example, a signal, which rises after the increase in the power supply voltage, is generated as the initial reset signal. The clock generation circuit 111 changes a frequency and a duty ratio of a clock signal in accordance with a control circuit generated by the power supply management circuit 114. The demodulation circuit 112 detects a change of the amplitude of the reception signal 120 of an ASK method as reception data 122 of "0"/"1". The demodulation circuit 112 corresponds to, for example, a low pass filter. The modulation circuit 113 transmits transmission data after changing the amplitude of the transmission signal 121 of an ASK method. For example, when transmission data 123 is "0", the point of resonance of the resonant circuit 108 is changed to change the amplitude of the communication signals. The power supply management circuit 114 monitors a power supply voltage supplied from the power supply circuit 109 to the logic portion 106 and the current consumption in the logic portion 106, and generates a control signal for changing the frequency and the duty ratio of the clock signal in the clock generation circuit 111.

In the wireless power storage unit 125, the induced electromotive force obtained in the resonance circuit 108 in accordance with the radio signals received by the antenna 107 is rectified by the power supply portion 126. The power supply portion 126 controls power storage and discharge of the power storage device 127. The power storage device 127 can store electricity and employ a so-called storage battery (battery). For example, a secondary battery such as a lithium-ion battery, a lithium secondary battery, a nickel hydride battery, a nickel-cadmium battery, an organic radical battery, a lead storage battery, an air secondary battery, a nickel-zinc battery, a silver zinc battery, or the like can be applied. It is to be noted that, for the power storage device 127, in addition to a storage battery (battery), a capacitor with a large capacity (for example, a layered ceramic capacitor, an electric double layer capacitor, or the like) can be applied. In particular, because the charge and discharge capacity of a lithium-ion battery and that of a lithium secondary battery is large, the semiconductor device 101 in this embodiment mode of the present invention can be made to be small by applying the lithium-ion battery of the lithium secondary battery to the power storage device 127. In a metal lithium battery, by use of a transition metal oxide that contains lithium ions, a metal oxide, a metal sulfide, an iron-based compound, a conductive polymer, an organic sulfur-based compound, or the like for a positive electrode active material; use of lithium (an alloy) for a negative electrode active material; and use of an organic-based electrolyte solution, a polymer electrolyte, or the like for an electrolyte, the charge and discharge capacity can be increased.

Next, operation of the semiconductor device in this embodiment mode will be described. In distribution industry, it is very important for product management to know when and where products passed. Moreover, information of a location and time are factors which satisfy customer's demands for reliability of a maker and a product. The case where the reader/writer writes location information and time information into the SRAM 104, which is provided in the semiconductor device 101, will be described below.

First, the semiconductor device 101 receives the reception signal 120 transmitted from the reader/writer. The reception signal 120 includes location information or time information which is to be written into the SRAM 104. The reception signal 120 is demodulated in the demodulation circuit 112 and decomposed into a control command, location information, time information or the like in the code extraction circuit 118 to be stored in the control register 117. Here, the control command is data which specifies a response of the semiconductor device 101. For example, the control command specifies transmission of a unique ID number, operation stop, decryption, and the like.

Next, in the logic portion 106, the CPU 102 writes location information or time information into the SRAM 104 in accordance with program data for writing stored in the mask ROM 103. Similarly to writing, the CPU 102 rewrites memory data of the SRAM 104 in accordance with program data for rewriting stored in the mask ROM 103. The transmission signal 121 regarding location information or time information once written into the SRAM 104 can be acquired by having the semiconductor device 101 receive the reception signal 120 which includes program data for reading location information or time information.

The wireless power storage unit 125 functions as a power supply for storing data of the SRAM 104.

Note that the CPU 102 accesses the mask ROM 103, the SRAM 104, and the control register 117 through the CPUIF 116. The CPUIF 116 has a function of generating access signals to any one of the mask ROM 103, the SRAM 104, and the control register 117 based on an address required by the CPU 102.

Transmission data 123 is generated in the encoding circuit 119 by using the response signal and is modulated in the modulation circuit 113 and then the transmission signal 121 is transmitted to the reader/writer from the antenna 107.

By employing this embodiment mode, data can be read directly from the SRAM so that reading time and processing time can be shorter compared to conventional non-volatile memories. Moreover, by providing the wireless power storage unit, data which is written to the SRAM can be stored so that high-speed operation of the system can be performed even immediately after resupply of electricity.

With above-described improvement in reading speed and writing speed, time required for communication between the semiconductor device and the reader/writer can be shortened. By attaching the semiconductor device in which data can be written in shorter response time, to a product and production components, historical information of a manufacturing process (unique ID number, a location of manufacture, manufacturing time, and the like) can be obtained. By shortening response time, data can be written into the semiconductor device without slowing down of a production line so that the semiconductor device can be easily applied to the production line. Moreover, by reading information written to the semiconductor device at high speed, the semiconductor devices can be automatically distributed into different steps in the manufacturing process and shipping destinations can be automatically distinguished, so that the efficiency of the production line can be enhanced.

By employing the above-described structure, the semiconductor device with improved response speed can be provided.

[Embodiment Mode 3]

Figure 3:
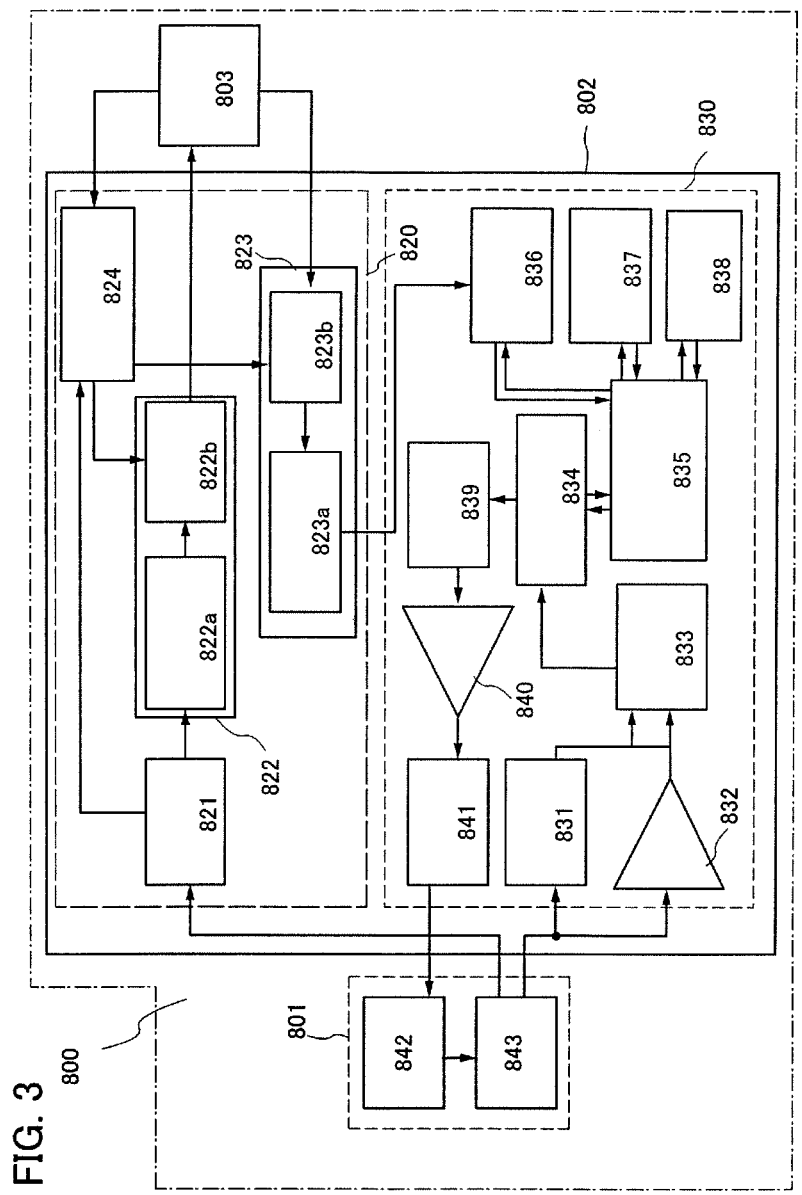
FIG. 3 is a block diagram showing a structure of a semiconductor device of the present invention.

Next, an exemplary structure of a semiconductor device 800 will be described with reference to FIG. 3. FIG. 3 is a block diagram of the semiconductor device 800. The semiconductor device 800 includes an antenna circuit 801, a signal processing circuit 802, and a power storage device 803.

The antenna circuit 801 transmits and receives signals. The antenna circuit 801 detects signals whose frequency corresponds to a form of the antenna circuit. A signal received by the antenna circuit 801 is converted into a DC power supply by the signal processing circuit 802 so that electricity is supplied to the power storage device 803.

A so-called storage battery (battery) can be applied to the power storage device 803. For example, a secondary battery such as a lithium-ion battery, a lithium secondary battery, a nickel hydride battery, a nickel-cadmium battery, an organic radical battery, a lead storage battery, an air secondary battery, a nickel-zinc battery, or a silver zinc battery can be applied. It is to be noted that, for the power storage device 803, in addition to the storage battery (battery), a capacitor with a large capacity (for example, a layered ceramic capacitor, an electric double layer capacitor, or the like) can be applied. In particular, because the charge and discharge capacity of a lithium-ion battery and that of a lithium secondary battery are large, the semiconductor device 800 in this embodiment mode of the present invention can be made to be small by applying the lithium-ion battery of the lithium secondary battery to the power storage device 803. In a metal lithium battery, by use of a transition metal oxide that contains lithium ions, a metal oxide, a metal sulfide, an iron-based compound, a conductive polymer, an organic sulfur-based compound, or the like for a cathode active material; use of lithium (an alloy) for an anode active material; and use of an organic-based electrolyte solution, a polymer electrolyte, or the like for an electrolyte, the charge and discharge capacity can be increased.

By formation of the active material and electrolyte of a lithium-ion battery by a sputtering method, the power storage device 803 can be formed over a substrate over which the signal processing circuit 802 is formed or, alternatively, over a substrate over which the antenna circuit 801 is formed. By formation of the power storage device 803 over a substrate over which the signal processing circuit 802 and the antenna circuit 801 are formed, the semiconductor device 800 can be a thin and light-weight film.

The antenna circuit 801 includes an antenna 842 and a resonance circuit 843. The antenna 842 has a function of receiving radio signals. The resonance circuit 843 is a circuit which generates induced electromotive force based on a radio signal received by the antenna 842 to acquire electricity.

The signal processing circuit 802 is roughly divided into a power supply portion 820 and a logic portion 830. The power supply portion 820 includes, as shown in FIG. 3, a rectifier circuit 821 which is connected to an output of the antenna circuit 801, a charge control circuit 822 which is connected to an output of the rectifier circuit 821, a discharge control circuit 823 which is connected to an output of the power storage device 803, and a switch control circuit 824 which controls the charge control circuit 822 and the discharge control circuit 823.

The charge control circuit 822 includes a regulator 822a and a switch 822b which is connected to an output of the regulator 822a. The output of the regulator 822a is connected to the power storage device 803 through the switch 822b.

The AC signal received by the antenna circuit 801 is half-wave rectified and smoothed in the rectifier circuit 821 to generate a DC voltage. The charge control circuit 822 is a circuit which makes a DC voltage, output from the rectifier circuit 821, a constant voltage and supplies it to the power storage device 803. The DC voltage output from the rectifier circuit 821 is set to be a constant DC voltage, which is input to the regulator 822a in the charge control circuit 822. The constant voltage generated in the regulator 822a is output to the power storage device 803 through the switch 822b to be stored. The regulator 822a is a circuit by which a voltage is set to be constant so that a voltage exceeding technical specifications is not applied to the power storage device 803. It is to be noted that not only a voltage of the DC voltage input but also a current of that may be set to be constant in the regulator 822a. In addition, if the switch 822b is a rectifier element like a diode, the regulator 822a may be omitted. That is, the charging control circuit 822 can be set to have a simple structure that includes a rectifier element only.

The discharge control circuit 823 includes a regulator 823a and a switch 823b which is connected to an input of the regulator 823a. The input of the regulator 823a is connected to an output of the power storage device 803 through the switch 823b. An output of the regulator 823a is connected to an SRAM 836. Electricity stored in the power storage device 803 is supplied to the SRAM 836 through the discharge control circuit 823. The electricity supplied from the power storage device 803 is set to be a constant voltage power supply by the regulator 823a, so that a voltage exceeding technical specifications can be prevented from being input to the SRAM 836. It is to be noted that not only a voltage of the DC voltage input but also a current of that may be set to be constant in the regulator 823a.

The switch control circuit 824 is a circuit which controls charging of the power storage device 803 and power supply to the SRAM 836 from the power storage device 803. An output of the power storage device 803 is connected to the switch control circuit 824, and the state of charge of the power storage device 803 is monitored using this output. In addition, the output of the rectifier circuit 821 is connected to the switch control circuit 824, and using this output, the magnitude of the amplitude (the magnitude of the electric field) of signals received by the antenna circuit 801 is monitored. The switch control circuit 824 monitors the output of the power storage device 803 and the rectifier circuit 821 and controls ON and OFF of the switch 822b and the switch 823b. For example, for the control of the switch 823b, the switch 823b is turned ON when the amount of voltage of the power storage device 803 reaches or exceeds a given value, V1, and electricity of the power storage device 803 is supplied to the SRAM 836. When the amount of voltage drops to or below a given value, V2 (V1>V2), the switch 823b is turned OFF, and the supply of electricity to the SRAM 836 is stopped. For example, the set value for V1 is set to be an amount of voltage by which data of the SRAM 836 can be stored stably, and the set value for V2 is set to be the minimum amount of voltage needed for storing data of the SRAM 836.

The logic portion 830 includes a demodulation circuit 831, an amplifier 832, a logic circuit 833, a control register 834, a CPUIF 835, the SRAM 836, a mask ROM 837, a CPU 838, a logic circuit 839, an amplifier 840, and a modulation circuit 841, each of which is connected as shown in FIG. 3. In the logic circuit 830, the amplifier 832 amplifies amplitude of a signal input to the antenna circuit 801 and supplies the signal as a clock signal to the logic circuit 833. Moreover, an ASK modulated or PSK modulated communication signal is demodulated in the demodulation circuit 831. The demodulated signal is also transmitted to the logic circuit 833 to be analyzed. The signal which is analyzed in the logic circuit 833 is transmitted to the control register 834 which then transmits a control signal based on the analyzed signal to the CPU 838 through the CPUIF 835.

The SRAM 836 is basically a working memory which temporarily stores data. In this embodiment mode, the SRAM 836 is combined with the wireless power storage unit so that data can be stored in the SRAM 836 even when electricity is not supplied from the reader/writer. The mask ROM 837 stores program data which is required for operating CPU 838. When the CPU 838 operates, an arithmetic processing is performed based on data read from the mask ROM 837. The CPU 838 performs the arithmetic processing in accordance with the control signal by reading data of a specified address from the mask ROM 837 or the SRAM 836 through the CPUIF 835. Data transmitted from the CPU 838 is encoded in the logic circuit 839. A signal having encoded data is amplified in the amplifier 840. In accordance with the signal, the modulation circuit 841 modulates a signal output from the antenna circuit 801. Here, in FIG. 3, electricity is supplied from the power storage device 803 provided outside of the logic portion 830 through the power supply portion 820. In this way, the logic portion 830 in the semiconductor device 800 operates.

In the semiconductor device 800 shown in FIG. 3, the wireless power storage unit includes the antenna circuit 801, the power supply portion 820, and the power storage device 803. Hereinafter, a method for charging the wireless power storage unit and for supplying electricity stored in the wireless power storage unit will be described.

In the semiconductor device 800, the power storage device 803 can be charged automatically by reception of electromagnetic waves. In addition, the antenna circuit 801 can detect a signal from a frequency band which corresponds to a form of the antenna circuit and convert the detected signal to a DC power supply so that electricity is generated. Furthermore, in exchange for a reader/writer, by use of a so-called feeder, a device which can transmit electromagnetic waves exclusively used for charging, the power storage device 803 can be charged intentionally and the situation where electricity in the SRAM 836 is drained can be prevented. Since a reader/writer includes a function for transmitting signals exclusively used for charging, the reader/writer can be made to function as a charger, as well.

By supplying electricity stored in the wireless power storage unit to the SRAM 836, data stored in the SRAM 836 can be held. Since data stored in the SRAM 836 can be held, when the semiconductor device starts communication with the reader/writer, data writing time to the SRAM 836 can be shortened and data transmission and reception to/from the CPU 838 can be rapidly performed by reading the SRAM 836 at high speed; so that processing system can be performed at high speed. Property of the SRAM 836, reading and writing performance at much higher-speed compared to other memories, can be actively utilized.

As described above, by combining a wireless power storage unit and an SRAM and incorporating them into a system of the semiconductor device, a semiconductor device with a CPU system with improved performance can be achieved.

[Embodiment 1]

Figure 4:
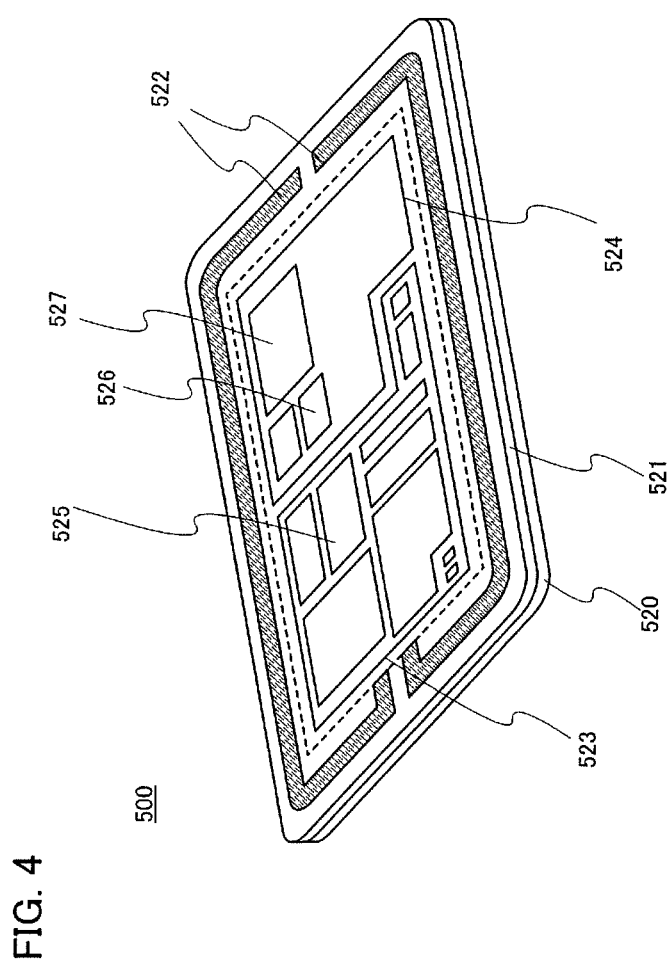
FIG. 4 is a perspective view of a semiconductor device of the present invention.

FIG. 4 is a perspective view illustrating one mode of the semiconductor device of the present invention. In FIG. 4, a semiconductor device 500 includes a substrate 520 and a cover material 521. As the substrate 520 and the cover material 521, a glass substrate, a quartz substrate, a plastic substrate, or an SOI (silicon on insulator) substrate can be used.

An antenna circuit 522, an analog portion 523 other than the antenna circuit 522, and a logic portion 524 are formed over the substrate 520. The cover material 521 overlaps with the substrate 520 so that the antenna circuit 522 and the analog portion 523 other than the antenna circuit 522, and the logic portion 524 are covered with the cover material. Note that the antenna circuit 522 can be formed over the substrate 520 or can be formed separately and attached to the substrate 522.

The analog portion 523 other than the antenna circuit 522 includes a wireless power storage unit 525 and the logic portion 524 includes an SRAM 526 and a CPU 527. In the present invention, electricity is supplied to the SRAM 526 from the wireless power storage unit 525.

Communication between the semiconductor device 500 and a reader/writer can be performed by modulating a radio wave used as a carrier (carrier wave). Although this embodiment shows a structure of the semiconductor device 500 which uses the carrier with 950 MHz, the frequency of the carrier is not limited to that value. As the carrier, radio waves with various frequencies such as 125 kHz and 13.56 MHz can be used. A transmission method of signals can be classified into an electromagnetic coupling method, an electromagnetic induction method, a micro-wave method and the like in accordance with a wavelength of the carrier. In addition, although there are many methods for modulation such as amplitude modulation, frequency modulation, and phase modulation, a modulation method is not particularly limited thereto.

Since this embodiment exemplifies a semiconductor device in the case of using an electric field for communication, a dipole antenna is used as the antenna circuit 522. In the case where a magnetic field is used for communication, a coiled antenna can be used as the antenna circuit 522.

In addition, this embodiment illustrates the structure of the semiconductor device 500 including the antenna circuit 522. However, the antenna circuit 522 is not always necessary for the semiconductor device of the present invention. Moreover, the semiconductor device shown in FIG. 4 can be provided with an oscillation circuit.

The semiconductor device of the present invention including the wireless power storage unit 525 and the SRAM 526 can be formed by a regular MOS process. Therefore, the semiconductor device can be miniaturized.

This embodiment can be combined with the Embodiment Modes 1 to 3 as appropriate.

[Embodiment 2]

Next, a method for manufacturing the semiconductor device of the present invention will be specifically described. Note that in this embodiment, a thin-film transistor (TFT) is shown as an example of a semiconductor element but the semiconductor element used for the semiconductor device of the present invention is not limited thereto. For example, in addition to a TFT, a memory element, a diode, a resistor, a coil, a capacitor, an inductor, and the like can be used.

Figure 5A:
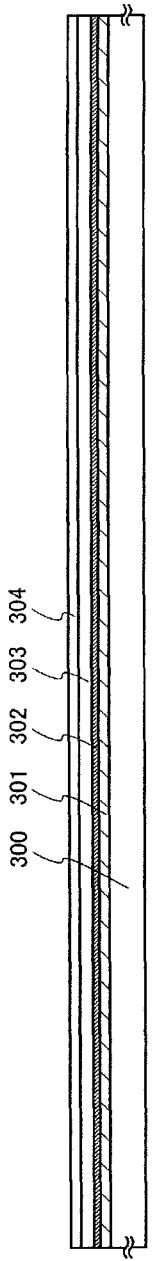
FIGS. 5A to 5C are diagrams showing a manufacturing method of a semiconductor device of the present invention.

As shown in FIG. 5A, an insulating film 301, a release layer 302, an insulating film 303 which functions as a base film, and a semiconductor film 304 are sequentially formed over a heat-resistant substrate 300. The insulating film 301, the release layer 302, the insulating film 303, and the semiconductor film 304 can be formed sequentially.

As the substrate 300, for example, a glass substrate made of barium borosilicate glass, aluminoborosilicate glass, or the like; a quartz substrate; a ceramic substrate, or the like can be used. Alternatively, a metal substrate including a stainless steel substrate or a semiconductor substrate including a silicon substrate and the like can be used. A substrate formed of a synthetic resin having flexibility, such as plastic, generally tends to have lower allowable temperature limit than the above-described substrates; however, the substrate can be used as long as it can resist a processing temperature in manufacturing steps.

In addition, as a plastic substrate, polyester typified by polyethylene terephthalate (PET); polyether sulfone (PES); polyethylene naphthalate (PEN); polycarbonate (PC); nylon; polyether etherketone (PEEK); polysulfone (PSF); polyether imide (PEI); polyarylate (PAR); polybutylene terephthalate (PBT); polyimide; an acrylonitrile butadiene styrene resin; poly vinyl chloride; polypropylene; poly vinyl acetate; an acrylic resin; and the like can be given.

Note that in this embodiment, the release layer 302 is formed over the entire surface of the substrate 300 but the structure of the present invention is not limited thereto. For example, the release layer 302 can be formed over a part of the substrate 300 by a photolithography method or the like.

The insulating films 301 and 303 are formed of silicon oxide, silicon nitride ($SiN_x$, $Si_3N_4$ or the like), silicon oxinitride ($SiO_xN_y$) (x>y>0), silicon nitride oxide ($SiN_xO_y$) (x>y>0) or the like by a CVD method, a sputtering method or the like.

The insulating films 301 and 303 are provided to prevent an alkali metal such as Na or an alkaline earth metal contained in the substrate 300 from diffusing into the semiconductor film 304 and causing an adverse effect on a characteristic of a semiconductor element such as TFT. Moreover, the insulating film 303 prevents an impurity element contained in the release layer 302 from diffusing into the semiconductor layer 304 and also has a role of protecting the semiconductor elements in a later step of separating the semiconductor elements.

The insulating films 301 and 303 may be a single layer of an insulating film or a stack of layers of a plurality of insulating films. In this embodiment, the insulating film 303 is formed by sequentially stacking a silicon oxynitride film with a thickness of 100 nm, a silicon nitride oxide film with a thickness of 50 nm, and a silicon oxynitride film with a thickness of 100 nm; however, a material, a thickness, and the number of films to be stacked are not limited thereto. For example, instead of the silicon oxynitride film in the bottom layer, a siloxane-based resin film with a thickness of 0.5 to 3 μm may be formed by using a spin coating method, a slit coating method, a droplet discharging method, a printing method, or the like. Instead of the silicon nitride oxide film in the middle layer, a silicon nitride film ($SiN_x$, $Si_3N_4$ or the like) may be formed. Instead of the silicon oxynitride film in the upper layer, the silicon oxide film may be formed. It is desirable that the thickness of each film is 0.05 to 3 μm, and the thickness can be freely selected from this range.

Alternatively, the lower layer of the insulating film 303, which is closest to the release layer 302, may be formed of a silicon oxynitride film or a silicon oxide film; the middle layer may be formed of a siloxane-based resin; and the upper layer may be formed of a silicon oxide film.

Note that the siloxane-based resin corresponds to a resin including a Si—O—Si bond formed using a siloxane-based material as a starting material. As a substituent, the siloxane-based resin may include at least any one of hydrogen, fluorine, an alkyl group, and aromatic hydrocarbon.

A silicon oxide film can be formed using a mixed gas of $SiH_4$ and $O_2$, TEOS (tetraethoxysilane) and $O_2$, or the like, by a method such as thermal CVD, plasma CVD, normal pressure CVD, or bias ECRCVD. In addition, a silicon nitride film can be formed typically using a mixed gas of $SiH_4$ and $NH_3$, by plasma CVD. Furthermore, a silicon oxynitride film and a silicon nitride oxide film can be formed typically using a mixed gas of $SiH_4$ and $N_2O$, by plasma CVD.

As the release layer 302, a film formed by a metal film, a metal oxide film, or a stacked layer of a metal film and a metal oxide film can be used. The metal film and the metal oxide film may a single layer or may employ a stacked-layer structure in which a plurality of layers are stacked. Moreover, in addition to the metal film and the metal oxide film, a metal nitride or metal oxynitride can be used. The release layer 302 can be formed by a sputtering method, a CVD method such as a plasma CVD method or the like.

As a metal for the release layer 302, tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and the like may be used. The release layer 302 may be a film formed of an alloy containing the above-described metal as its main component, or a film formed of a compound containing the above-described metal, in addition to a film formed of the above-described metal.

Moreover, the release layer 302 may be a film formed of only silicon (Si) or a film formed of a compound containing silicon (Si). Alternatively, a film formed of an alloy containing silicon (Si) and the above-described metal may also be used. A film containing silicon may be any of amorphous, micro crystal, or polycrystal.

As the release layer 302, a single layer of the above-described film or a stacked layer of a plurality of the above-described films may be used. The release layer 302, which is a stacked layer of a metal film and a metal oxide film, is formed by forming a base metal film and oxidizing or nitriding the surface of the base metal film. Specifically, a plasma treatment is applied to the base metal film in an oxygen atmosphere or a $N_2O$ atmosphere, or a heat treatment is applied to the base metal film in an oxygen atmosphere or a $N_2O$ atmosphere. Moreover, the surface of the base metal film may be oxidized by forming a silicon oxide film or a silicon oxynitride film to be in contact with the base metal film. The surface of the base metal film may also be nitrided by forming a silicon nitride oxide film or a silicon nitride film to be in contact with the base metal film.

As a plasma treatment which oxidizes or nitrides a metal film, a high-density plasma treatment in which a plasma density is greater than or equal to $1\times10^{11}$ $cm^{-3}$ or preferably in a range of $1\times10^{11}$ $cm^{-3}$ to $9\times10^{15}$ $cm^{-3}$ and which uses a high frequency wave such as a micro wave (for example, a frequency is 2.45 GHz) may be performed.

Note that by oxidizing the surface of the base metal film, the release layer 302, which is a stacked layer of the metal film and the metal oxide film, may be formed; but the metal oxide film may also be formed separately after the metal film is formed.

For example, in the case where tungsten is used as a metal, a tungsten film is formed as the base metal film by a sputtering method, a CVD method, or the like and then a plasma treatment is applied to the tungsten film. Therefore, the tungsten film as the metal film and the metal oxide film formed of tungsten oxide, which is in contact with the metal film, can be formed.

Tungsten oxide is represented by $WO_x$ where x is in a range of 2 to 3; there are cases where x is 2 ($WO_2$), where x is 2.5 ($W_2O_5$), where x is 2.75 ($W_4O_{11}$), where x is 3 ($WO_3$), and the like. In forming the tungsten oxide, there are no particular restrictions on the value of the aforementioned x which may be decided based on the etching rate or the like.

It is desirable that the semiconductor film 304 is formed without being exposed to air after the insulating film 303 is formed. The thickness of the semiconductor film 304 is 20 to 200 nm (preferably, 40 to 170 nm and more preferably, 50 to 150 nm). Note that the semiconductor film 304 may be an amorphous semiconductor or a poly-crystalline semiconductor Moreover, in addition to silicon, silicon germanium may be used as the semiconductor. In the case of using silicon germanium, the concentration of germanium is preferably about 0.01 to 4.5 atomic %.

The semiconductor film 304 may be crystallized by a known technique. As the known technique of crystallization, a laser crystallization method using a laser beam and a crystallization method using a catalytic element are given. Alternatively, a crystallization method using a catalytic element and a laser crystallization method may be combined. In the case where a heat-resistant substrate such as quartz is used as the substrate 300, the semiconductor film 304 may be crystallized by a combination of a crystallization method using a high-temperature annealing at approximately 950° C. and a thermal crystallization method using a electrically-heated oven, a lamp annealing crystallization method using infrared light, or a crystallization method using the catalytic element.

For example, in the case where the laser crystallization method is employed, the thermal treatment is applied to the semiconductor film 304 at 550° C. for four hours in order to enhance resistance of the semiconductor film 304 to a laser. Then, by irradiating the semiconductor film 304 with a laser beam of second to fourth harmonics of the fundamental wave, using a solid laser capable of continuous oscillation, a crystal with large grain size can be obtained. For example, it is desirable that a second harmonic wave (532 nm) or a third harmonic wave (355 nm) of an Nd:YVO$_4$ laser (having a fundamental wave of 1064 nm) is mainly used. Specifically, laser light emitted from a continuous-wave YVO$_4$ laser is converted into a harmonic by using a non-linear optical element, thereby obtaining laser light with output of 10 W. Then, the laser light is preferably shaped into a rectangular or elliptical shape on an irradiated surface by an optical system, for the irradiation of the semiconductor film 304. The power density at this time is required to be approximately 0.01 to 100 MW/cm$^2$ (preferably 0.1 to 10 MW/cm$^2$). In addition, the scan rate is set at approximately 10 to 2000 cm/sec.

As a continuous wave gas laser, an Ar laser, a Kr laser, or the like can be used. As a continuous wave solid laser, a YAG laser, a YVO$_4$ laser, a YLF laser, a YAlO$_3$ laser, a forsterite (Mg$_2$SiO$_4$) laser, a GdVO$_4$ laser, a Y$_2$O$_3$ laser a glass laser, a ruby laser, an alexandrite laser, a Ti:sapphire laser, or the like can be used.

Moreover, as a pulsed laser, for example, an Ar laser, a Kr laser, an excimer laser, a CO$_2$ laser, a YAG laser, a Y$_2$O$_3$ laser, a YVO$_4$ laser, a YLF laser, a YAlO$_3$ laser, a glass laser, a ruby laser, an alexandrite laser, a Ti:sapphire laser, a copper vapor laser, or a gold vapor laser may be used.

The laser crystallization may also be performed by pulsed laser light at a repetition rate of greater than or equal to 10 MHz, which is a drastically higher frequency band than a generally used frequency band of several ten to several hundred Hz. It is said that the time between irradiation of the semiconductor film 304 with pulsed laser light and its complete solidification is several ten to several hundred nsec. Therefore, by using the above-described frequency band, the semiconductor film 304 can be irradiated with the next pulse of laser light during the period from melting of the semiconductor film 304 by the preceding pulse to completion of solidification of the semiconductor film 304. Therefore, an interface between a solid phase and a liquid phase can be moved continuously in the semiconductor film 304, whereby the semiconductor film 304 having crystal grains grown continuously toward a scanning direction can be obtained. Specifically, an aggregate of crystal grains having widths of 10 to 30 μm in the scanning direction and widths of approximately 1 to 5 μm in the direction perpendicular to the scanning direction can be formed. By forming such crystal grains of single crystal grown continuously in the scanning direction, the semiconductor film 304 having few grain boundaries at least in the channel direction of the TFT can be formed.

It is to be noted that, in laser crystallization, continuous wave laser light of a fundamental wave and continuous wave laser light of a harmonic may be radiated at the same time, or continuous wave laser light of a fundamental wave and pulsed laser light of a harmonic may be radiated.

Laser light irradiation may be performed in an inert gas atmosphere such as in a rare gas or nitrogen. Accordingly, roughness of the surface of the semiconductor film caused by laser irradiation can be suppressed, and variations in the threshold voltage of transistors caused by variations in interface state density can be suppressed.

By irradiation with above-described laser light, the semiconductor film 304 with higher crystallinity is formed. Note that a polycrystalline semiconductor which is formed in advance by a sputtering method, a plasma CVD method, a thermal CVD method, or the like may be used as the semiconductor film 304.

Although the semiconductor film 304 is crystallized in this embodiment, the semiconductor film 304 may remain as an amorphous semiconductor film or a microcrystal semiconductor film without crystallization to go on to the following process. Since the number of manufacturing steps of a TFT using an amorphous semiconductor or a micro crystal semiconductor is smaller than that of a TFT using a polycrystalline semiconductor, the TFT using the amorphous semiconductor or the microcrystal semiconductor has advantages that the cost is reduced and a yield is improved.

The amorphous semiconductor may be obtained by glow discharge decomposition of a gas containing silicon. As the gas containing silicon, SiH$_4$ or Si$_2$H$_6$ may be used. These gases containing silicon may be diluted with hydrogen or hydrogen and helium.

Figure 5B:
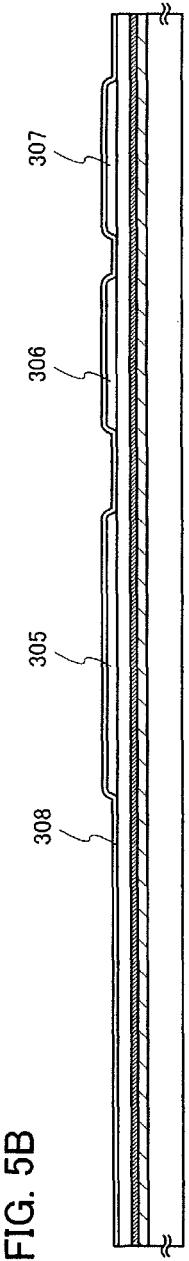

Next, as shown in FIG. 5B, the semiconductor film 304 is processed (patterned) into a predetermined shape to form island-shaped semiconductor films 305 to 307. Then, a gate insulating film 308 is formed so as to cover the island-shaped semiconductor films 305 to 307. The gate insulating film 308 may be formed by using a single layer or a stacked layer of silicon nitride, silicon oxide, silicon nitride oxide, or/and silicon oxynitride by a plasma CVD method, a sputtering method, or the like. In the case of using a stacked layer, for example, three-layer structure which is formed by stacking a silicon oxide film, a silicon nitride film and a silicon oxide film in this order from the side of the substrate 300 is preferable.

The gate insulating film 308 may be formed by oxidizing or nitriding the surfaces of the island-shaped semiconductor films 305 to 307 by performing a high-density plasma treatment. The high-density plasma treatment is performed, for example, by using a mixed gas of an inert gas such as He, Ar, Kr, or Xe, and oxygen, nitrogen oxide, ammonia nitrogen, hydrogen, or the like. In this case, by performing excitation of plasma with introduction of a microwave, plasma with a low electron temperature and high density can be generated. By an oxygen radical (there is a case where an OH radical is included) and/or a nitrogen radical (there is a case where an NH radical is included) generated by this high density plasma, the surface of the semiconductor film can be oxidized or nitrided whereby an insulating film with a thickness of 1 to 20 nm, typically 5 to 10 nm, may be formed so as to be in contact with the semiconductor film. This insulating film with a thickness of 5 to 10 nm is used as the gate insulating film 308.

Since oxidation or nitridation of the semiconductor film by the above-described high-density plasma treatment is progressed with solid reaction, interface state density between the gate insulating film and the semiconductor film can be extremely lowered. Moreover, by directly oxidizing or nitriding the semiconductor film by the high-density plasma treatment, variations in the thickness of the insulating film formed may be reduced. Moreover, in the case where the semiconductor film has crystallinity, the surface of the semiconductor film is oxidized with solid reaction by the high-density plasma treatment to restrain fast oxidation only in a crystal grain boundary; therefore, the gate insulating film with uniformity and low interface state density can be formed. A transistor, in which the insulating film formed by the high-density plasma treatment is included in a part of or the entire gate insulating film, may reduce variations in a characteristic.

Figure 5C:
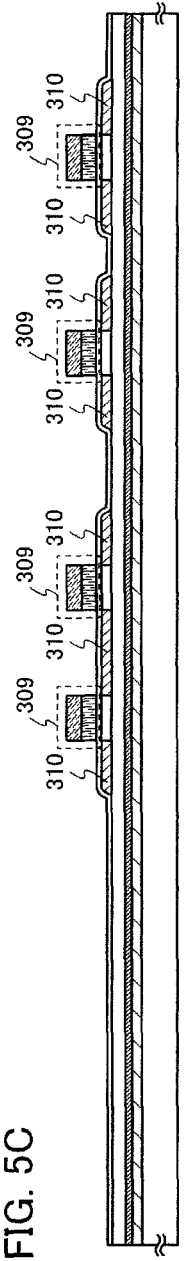

Next, as shown in FIG. 5C, after a conductive film is formed over the gate insulating film 308, the conductive film is processed (patterned) into a predetermined shape to form gate electrodes 309 over the island-shaped semiconductor films 305 to 307. In this embodiment, stacked layers of two conductive films are patterned to form the gate electrodes 309. As the conductive film, tantalum (Ta), tungsten (W), titanium (Ti), molybdenum (Mo), aluminum (Al), copper (Cu), chromium (Cr), niobium (Nb), or the like may be used.

Moreover, an alloy containing the above-mentioned metal as the main component or a compound containing the above-mentioned metal may be used. Alternatively, the gate electrode 309 may be formed of a semiconductor such as polycrystalline silicon doped with an impurity element such as phosphorus which imparts conductivity to the semiconductor film.

In this embodiment, a tantalum nitride film or a tantalum (Ta) film is used as a conductive film in the first layer, and a tungsten (W) film is used as a conductive film in the second layer. As a combination of these two conductive films, the following pairs are possible in addition to the example shown in this embodiment: a tungsten nitride film and a tungsten film; a molybdenum nitride film and a molybdenum film; an aluminum film and a tantalum film; an aluminum film and a titanium film, and the like. Since tungsten and tantalum nitride have high heat resistance, thermal treatment may be performed for thermal activation in the step after formation of the two layers of the conductive films. Moreover, as a combination of the two layers of the conductive films, for example, the following pairs may be used: nickel silicide and silicon doped with impurities imparting n-type conductivity; $WSi_x$ and Si doped with impurities imparting n-type conductivity, and the like.

Moreover, although the gate electrodes 309 are formed of stacked layers of the two conductive films in this embodiment, the structure in this embodiment is not limited thereto. Each of the gate electrodes 309 may be formed of a single layer of a conductive film, and also formed of stacked layers of more than three conductive films. In the case of using a three-layer structure which is stacked with more than three conductive films, a stacked structure of a molybdenum film, an aluminum film, and a molybdenum film is preferable.

A CVD method, a sputtering method, or the like may be used for forming the conductive film. In this embodiment, the conductive film with a thickness of 20 to 100 nm is formed in the first layer, and the conductive film with a thickness of 100 to 400 nm is formed in the second layer.

As a mask which is used to form the gate electrodes 309, silicon oxide, silicon oxynitride, or the like may be used as a mask instead of a resist. In that case, a step is added in which a mask of silicon oxide, silicon oxynitride, or the like is formed by patterning. However, film reduction of a mask in etching is not so obvious compared to that of resist so the gate electrode 309 with a predetermined width may be formed. Alternatively, the gate electrode 309 may be selectively formed without using a mask but by a droplet-discharge method.

Note that a droplet-discharge method is a method in which a predetermined pattern is formed by discharging or ejecting droplets containing a predetermined composition and an ink-jet method is included in the category.

Next, by using the gate electrodes 309 as masks, the island-shaped semiconductor films 305 to 307 are doped with an impurity element imparting n-type conductivity (typically P (phosphorus) or As (arsenic)) at a low concentration (the first doping step). As a condition of the first doping step, although a dose amount is set to $1\times10^{15}$ to $1\times10^{15}/cm^3$ and acceleration voltage is set to 50 to 70 keV, these values are not limited thereto. In the first doping step, the island-shaped semiconductor films 305 to 307 are doped through the gate insulating film 308 so that low-concentration impurity regions 310 are formed in each of the semiconductor film 305 to 307. Note that the first doping step may be performed by covering the island-shaped semiconductor film 305 which is to be a p-channel TFT with a mask.

Next, as shown in FIG. 6A, a mask 311 is formed to cover the island-shaped semiconductor films 306 and 307 which is to be an n-channel TFT. Then, the island-shaped semiconductor film 305 is doped with an impurity element imparting p-type conductivity (typically B (boron)) at high concentration by using the gate electrodes 309 as a mask in addition to the mask 311 (the second doping step). As a condition of the second doping step, a dose amount is set to $1\times10^{19}$ to $1\times10^{20}/cm^3$ and acceleration voltage is set to 20 to 40 keV. In the second doping step, the island-shaped semiconductor film 305 is doped through the gate insulating film 308 so that p-type high-concentration impurity regions 312 are formed.

Next, as shown in FIG. 6B, an insulating film is formed so as to cover the gate insulating film 308 and the gate electrodes 309 after the mask 311 is removed by ashing or the like. The insulating film is formed by using a single layer or a stacked layer of the following films: a silicon film; a silicon oxide film; a silicon oxynitride film; or/and a silicon nitride oxide film; or/and a film containing an organic material such as an organic resin by a plasma CVD method, a sputtering method, or the like. In this embodiment, a silicon oxide film with a thickness of 100 nm is formed by a plasma CVD method.

The gate insulating film 308 and the insulating film are partially etched by anisotropic etching which is based on a perpendicular direction to form gate insulating films 313 which is partially formed over the island-shaped semiconductor films 305 to 307. Moreover, the insulating film is partially etched by aforementioned anisotropic etching to form sidewalls 314 which are in contact with side surfaces of the gate electrodes 309. The sidewalls 314 are used as masks for doping when an LDD (lightly doped drain) region is formed. In this embodiment, as an etching gas, a mixed gas of $CHF_3$ and He is used. Note that a process for forming the sidewalls 314 is not limited thereto.

Next, a mask is formed so as to cover the island-shaped semiconductor film 305 which is to be a p-channel TFT. In addition to the mask, the gate electrode 309 and the sidewalls 314 are used as a mask to dope the island-shaped semiconductor films 306 and 307 with an impurity element (typically P or As) which imparts n-type conductivity at high concentration (the third doping step). As a condition of the third doping step, a dose amount is set to $1\times10^{19}$ to $1\times10^{20}/cm^3$ and acceleration voltage is set to 60 to 100 keV. In the third doping step, pairs of the n-type high-concentration impurity regions 315 are formed in each of the island-shaped semiconductor films 306 and 307.

Note that the sidewalls 314 function as a mask when a low-concentration impurity region or a non-doped offset region is formed under the sidewalls 314 in doping with impurities imparting n-type conductivity at high concentration. Therefore, to control a width of the low-concentration impurity region or the offset region, a condition of anisotropic etching for forming the sidewalls 314 or a thickness of the insulating film for forming the sidewalls 314 may be appropriately changed to adjust a size of the sidewalls 314.

After the mask is removed by ashing or the like, the impurity regions may be activated by thermal treatment. For example, after a silicon oxynitride film with a thickness of 50 nm is formed, thermal treatment may be performed at 550° C. for four hours in a nitrogen atmosphere.

Moreover, after a silicon nitride film containing hydrogen is formed with a thickness of 100 nm, thermal treatment may be performed at 410° C. for an hour in a nitrogen atmosphere to hydrogenate the island-shaped semiconductor films 305 to 307. Alternatively, thermal treatment at 300 to 450° C. for 1 to 12 hours in an atmosphere containing hydrogen may be performed to hydrogenate the island-shaped semiconductor films 305 to 307. As thermal treatment, thermal anneal, laser anneal, RTA, or the like may be used. By thermal treatment, the impurity element added to the semiconductor film is not only hydrogenated but also activated. Further, plasma hydrogenation (using hydrogen excited by plasma) may also be performed as another means of hydrogenation. Through the hydrogenation process, dangling bonds may be terminated by thermally excited hydrogen.

Through the above-described course of the process, n-channel TFTs 318 and 319, and a p-channel TFT 317 are formed.

Next, as shown in FIG. 6C, an insulating film 320 is formed to function as a passivation film which protects the TFTs 317 to 319. Although the insulating film 320 is not always necessary, impurity elements such as alkali metal and alkaline earth metal are prevented from entering the TFTs 317 to 319 by the insulating film 320. Specifically, as the insulating film 320, silicon nitride, silicon nitride oxide, aluminum nitride, aluminum oxide, silicon oxide, and the like may be used. In this embodiment, a silicon oxynitride film with a thickness of approximately 600 nm is used as the insulating film 320. In this case, the above-described hydrogenation process may be performed after the silicon oxynitride film is formed.

Next, an insulating film 321 is formed over the insulating film 320 so as to cover the TFTs 317 to 319. An organic material with heat resistance such as polyimide, acrylic, benzocyclobutene, polyamid, epoxy, or the like can be used for the insulating film 321. In addition to the organic materials listed above, a low-dielectric constant material (a low-k material), a siloxane-based resin, silicon oxide, silicon nitride, silicon oxynitride, silicon nitride oxide, PSG (phosphosilicate glass), BPSG (boro-phosphosilicate glass), alumina, or the like may be used. As a substituent, the siloxane-based resin may include at least any one of hydrogen, fluorine, an alkyl group, and aromatic hydrocarbon. Insulating films formed of these materials may be stacked to form the insulating film 321.

The insulating film 321 may be formed by a CVD method, a sputtering method, an SOG method, a spin coating method, a dipping method, a spray-coating method, a droplet discharging method (ink jetting, screen printing, offset printing, or the like), a doctor knife, a roll coater, a curtain coater, a knife coater, or the like, depending on the material thereof.

Next, contact holes are formed in the insulating films 320 and 321 so as to expose a part of each of the island-shaped semiconductor films 305 to 307. Then, a conductive film 322 and conductive films 323 to 326 which are in contact with the island-shaped semiconductor films 305 to 307 through the contact holes are formed. As an etching gas for forming the contact holes, a mixed gas of $CHF_3$ and He is employed, but the etching gas is not limited thereto.

The conductive films 322 to 326 can be formed by a CVD method, a sputtering method, or the like. Specifically, as the conductive films 322 to 326, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), silicon or the like can be used. Moreover, an alloy containing the above-described metal as the main component or a compound containing the above-described metal may be used. The conductive films 322 to 326 may be formed by using single layers or staked-layers of the films including the metals listed above.

As an exemplary alloy containing aluminum as a maim component, an alloy containing aluminum as the main component and containing nickel is given. In addition, an alloy containing aluminum as the main component and containing nickel, and carbon or/and silicon may be given as an example.

Since aluminum and aluminum-silicon have low resistance values and are inexpensive, they are suitable for a material for forming the conductive films 322 to 326. In particular, compared to an aluminum film, an aluminum-silicon (Al—Si) film can reduce generation of a hillock in baking a resist when the conductive films 322 to 326 are being patterned. Moreover, Cu of approximately 0.5% may be mixed instead of the Si into the aluminum film.

For example, for the conductive films 322 to 326, a stacked-layer structure of a barrier film, an aluminum-silicon (Al—Si) film, and a barrier film or a stacked-layer structure of a barrier film, an aluminum-silicon (Al—Si) film, a titanium nitride film, and a barrier film may be employed. The barrier film is a film formed of titanium, a nitride of titanium, molybdenum, or a nitride of molybdenum. When the barrier films are formed so as to sandwich the aluminum-silicon film therebetween, generation of a hillock in aluminum or aluminum-silicon may be prevented. Further, when the barrier film is formed of titanium, which is highly reducible, even if a thin oxide film is formed over the island-shaped semiconductor films 305 to 307, this oxide film can be reduced by titanium contained in the barrier film and good contact between the island-shaped semiconductor films 305 to 307 and the conductive films 323 to 326 can be made. Moreover, a plurality of barrier films may be stacked. In that case, for example, the conductive films 322 to 326 may be a five-layer structure of titanium, titanium nitride, aluminum silicon, titanium, and titanium nitride.

Note that the conductive films 324 and 325 are connected to the high-concentration impurity regions 315 in the n-channel TFT 318; the conductive films 325 and 326 are connected to the high-concentration impurity regions 315 in the n-channel TFT 319; and the conductive films 323 are connected to the high-concentration impurity regions 312 in the p-channel TFT 317. The all impurity regions 312 in the p-channel TFT 317 are electrically connected to each other through the conductive films 323. Moreover, in the p-channel TFT 317, the two gate electrodes 309 are electrically connected to each other so that the p-channel TFT 317 functions as a MOS varactor.

Next, as shown in FIG. 7A, an insulating film 330 is formed so as to cover the conductive films 322 to 326 and then a contact hole is formed in the insulating film 330 to expose a part of the conductive film 322. Then, in the contact hole, a conductive film 331 is formed so as to be in contact with the conductive film 322. Any materials may be used for the conductive film 331 as long as the materials may be used for the conductive films 322 to 326.

The insulating film 330 may be formed of an organic resin film, an inorganic insulating film, or a siloxane-based insulating film. As the organic resin film, for example, acrylic, epoxy, polyimide, polyamide, polyvinyl phenol, benzocyclobutene, or the like may be used. As the inorganic insulating film, a film containing silicon oxide, silicon oxynitride, silicon nitride oxide, carbon typified by DLC (diamond like carbon), or the like may be used. Note that a mask for formation of an opening by a photolithography method may be formed by a droplet discharging method or a printing method. The insulating film 330 may be formed by a CVD method, a sputtering method, a droplet discharging method, a printing method, or the like in accordance with the materials.

Next, a conductive film 332 functioning as an antenna is formed so as to be partly in contact with the conductive film 331. For formation of the conductive film 332, a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni) may be used. In addition to a film formed of the above-described metal, a film formed of an alloy containing the above-described metal as the main component or a film formed of a compound containing the above-described metal may be used for the conductive film 332. The conductive film 332 may be either of a single layer of the above-described film and may also be a stacked layer of a plurality of the above-described films.

The conductive film 332 may be formed by a CVD method, a sputtering method, a printing method such as screen printing, gravure printing, or the like, a droplet discharging method, a dispensing method, a plating method, a photolithography method, a vapor deposition method, or the like.

For example, in the case where a screen printing method is employed, the conductive film 332 may be formed as follows: conductive particles having a grain size of several nm to several tens of μm are dispersed in an organic resin to make conductive paste; and then the conductive paste is selectively printed on the insulating film 330. The conductive particles may be formed of silver (Ag), gold (Au), copper (Cu), nickel (Ni), platinum (Pt), palladium (Pd), tantalum (Ta), molybdenum (Mo), tin (Sn), lead (Pb), zinc (Zn), chromium (Cr), titanium (Ti), or the like. In addition to the above-described metals, the conductive particles may be formed of an alloy containing the above-described metal as the main component or a conductive particles may be formed of a compound containing the above-described metal. Fine particles of silver halide or dispersible nanoparticles may also be used. Moreover, as the organic resin contained in the conductive paste, polyimide, a siloxane-based resin, an epoxy resin, a silicon resin or the like may be used.

As an example of an alloy containing the above-described metals, following pairs may be given: silver (Ag) and palladium (Pd); silver (Ag) and platinum (Pt); gold (Au) and platinum (Pt); gold (Au) and palladium (Pd); and silver (Ag) and copper (Cu). In addition, for example, conductive particles of copper (Cu) coated with silver (Ag) may be used.

For formation of the conductive film 332, baking is preferably performed after the conductive paste is pushed out by a printing method or a droplet discharging method. For example, for the conductive paste, when conductive particles (for example, with a grain size of greater than or equal to 1 nm and less than or equal to 100 nm) that contain silver as the main component are used, by baking at a temperature within the temperature range of from 150° C. to 300° C., the conductive film 332 can be obtained. 1o Baking may be lamp annealing using an infrared lamp, a xenon lamp, a halogen lamp, or the like, may also be furnace annealing using an electric furnace. A laser annealing method using an excimer laser or Nd:YAG laser may also be possible. Further, fine particles that contain solder or lead-free solder as the main component may be used, and, in this case, using fine particles with a grain size of 20 μm or less is preferable. Solder and lead-free solder have an advantage in that they are both low cost.

By using a printing method or a droplet discharging method, the conductive film 332 can be formed without using a mask for light-exposure. Moreover, unlike a photolithography method, a printing method or a droplet discharging method may form the conductive film 332 without waste of materials to be removed by etching. The expensive mask for light-exposure is not necessary so that cost for manufacturing a semiconductor device can be reduced.

As shown in FIG. 7B, an insulating film 333 is formed over the insulating film 330 so as to cover the conductive films 331 and 332. The conductive film 333 may be formed of an organic resin film, an inorganic insulating film, or a siloxane-based insulating film. As the organic resin film, for example, acrylic, epoxy, polyimide, polyamide, polyvinyl phenol, benzocyclobutene, or the like may be used. As the inorganic insulating film, a film containing silicon oxide, silicon oxynitride, silicon nitride oxide, carbon typified by DLC (diamond like carbon), or the like may be used. Note that a mask for formation of an opening by a photolithography method may be formed by a droplet discharging method, a printing method, or the like. The insulating film 333 may be formed by a CVD method, a sputtering method, a droplet discharging method, a printing method, or the like in accordance with the materials thereof.

Next, as shown in FIG. 8A, a layer including the insulating films 303 and 333, various conductive films and semiconductor elements typified by TFTs (hereinafter referred to as a element formation layer 334) is peeled off from the substrate 300. In this embodiment, the surface of the insulating film 333, included in the element formation layer 334, is attached to a first sheet material 335. Then, the element formation layer 334 is peeled off by physical force from the substrate 300. The release layer 302 may be partially left without being removed entirely.

Moreover, the above-described peeling process may be performed by etching the release layer 302. In that case, a groove is formed so as to partially expose the release layer 302. The groove is formed by dicing, scribing, irradiation with laser light including UV light, a photolithography method, or the like. The groove may have such a depth that the release layer 302 is exposed. As an etching gas, halogen fluoride is used which is introduced from the groove. In this embodiment, for example, the etching is performed using $ClF_3$ (chlorine trifluoride) at a temperature of 350° C. with a flow rate of 300 seem and air pressure of 6 Torr for 3 hours. Alternatively, a gas in which nitrogen is mixed into a $ClF_3$ gas may be used. When halogen fluoride such as $ClF_3$ is used, the release layer 302 is selectively etched and the substrate 300 can be separated from the TFTs 317 to 319. Further, the halogen fluoride may be either a gas or a liquid.

Next, as shown in FIG. 8B, the surface exposed by peeling off the element formation layer 334 is attached to a second sheet material 336. Then, the element formation layer 334 is peeled off from the first sheet material 335.

In the case where semiconductor elements for a plurality of semiconductor devices are formed over the substrate 300, the element formation layer 334 is divided into each semiconductor device. To divide the element formation layer 334, a laser irradiation apparatus, a dicing apparatus, a scribing apparatus, or the like may be used.

Although this embodiment shows an example in which the antenna and the semiconductor element are formed over the same substrate, the present invention is not limited thereto. After a semiconductor element is formed, an antenna which is formed separately may be electrically connected to a signal processing circuit. In that case, the antenna and the signal processing circuit are electrically connected to each other by pressure bonding by using an anisotropic conductive film (ACF) or an anisotropic conductive paste (ACP). Alternatively, conductive adhesive such as silver paste, copper paste, or carbon paste, a solder joint, or the like can be used for connection.

When the semiconductor device shown in FIG. 8B is formed, a third sheet material may be attached so as to cover the insulating film 333 followed by one or both of thermal treatment and pressure treatment so that the second sheet material 336 and the third sheet material are attached to each other. As the second sheet material 336 and the third sheet material, a hot melt film or the like can be used. Alternatively, the third sheet material is not always necessary because the first sheet material 335 and the second sheet material 336 may be attached to each other without peeling off the first sheet material 335.

As the second sheet material 336 and the third sheet material, a film, on which antistatic treatment for preventing static electricity or the like has been applied (hereinafter referred to as an antistatic film), can be used. By sealing with the antistatic film, adverse effect of static electricity from outside on a semiconductor element may be controlled.

The antistatic film may be classified into several types: a film in which a material preventing static electrification (antistatic agent) is included; a film with an antistatic feature; a film coated with an antistatic agent, and the like. As an antistatic agent, a nonionic-polymer-based material, an anionic-polymer-based material, a cationic-polymer-based material, a nonionic-surfactant-based material, an anionic-surfactant-based material, a cationic-surfactant-based material, or an amphoteric-surfactant base material may be used. In addition, a metal, indium tin oxide (ITO), or the like may be used as the antistatic agent. As a material of the film with the antistatic feature, an olefin-based resin, an ABS resin, a styrene-based resin, a PMMA resin, a polycarbonate-based resin, a PVC polyester-based resin, a polyamide resin, a modified PPO resin, or the like may be used.

Note that this embodiment may be combined with the above-described embodiment mode or the other embodiments.

[Embodiment 3]

In this embodiment, an example is shown in which the semiconductor device of the present invention is manufactured by using a transistor formed on a single crystalline substrate. The transistor formed on the single crystalline substrate can prevent variations in characteristics so that the number of transistors for a semiconductor device may be reduced.

First, as shown in FIG. 9A, element isolation insulating films 2301 are formed by using insulating films in a semiconductor substrate 2300 in order to electrically isolate semiconductor elements from each other. By forming the element isolation insulating films 2301, element formation regions 2302 and 2303 where transistors are formed, are electrically isolated from each other As the semiconductor substrate 2300, for example, a single crystalline silicon substrate having n-type or p-type conductivity, a compound semiconductor substrate (GaAs substrate, InP substrate, GaN substrate, SiC substrate, sapphire substrate, ZnSe substrate, or the like), an SOI (Silicon On Insulator) substrate manufactured by a bonding method or a SIMOX (Separation by Implanted Oxygen) method, or the like can be used.

For forming the element isolation insulating films 2301, a selective oxidation method (LOCOS (local oxidation of silicon) method), a trench isolation method, or the like can be used as appropriate.

In this embodiment, an example is shown in which a single crystalline silicon substrate having n-type conductivity is used as the semiconductor substrate 2300 and a p-well 2304 is provided in the element formation region 2303. The p-well 2304 in the element formation region 2303 in the semiconductor substrate 2300 can be formed by selectively introducing an impurity element having p-type conductivity into the element formation region 2303. As the impurity element imparting p-type conductivity, boron (B), aluminum (Al), gallium (Ga), or the like can be used. In the case where a semiconductor substrate having p-type conductivity is used as the semiconductor substrate 2300, an n-well may be formed by selectively introducing an impurity element imparting n-type conductivity to the element formation region 2303.

Note that although an impurity element is not introduced into the element formation region 2302 because a semiconductor substrate having n-type conductivity is used as the semiconductor substrate 2300 in this embodiment, an n-well may be formed in the element formation region 2302 by introducing an impurity element which imparts n-type conductivity. As the impurity element imparting n-type conductivity, phosphorus (P), arsenic (As), or the like can be used.

Next, as shown in FIG. 9B, insulating films 2305 and 2306 are formed so as to cover the element formation regions 2302 and 2303, respectively. In this embodiment, by thermally oxidizing the semiconductor substrate 2300, silicon oxide films formed over the element formation regions 2302 and 2303 are used as the insulating films 2305 and 2306. Moreover, after the silicon oxide films are formed by thermal oxidation, silicon oxynitride films are formed by nitriding the surfaces of the silicon oxide films so that stacked layers of the silicon oxide films and the silicon oxynitride films may be used as the insulating films 2305 and 2306.

Alternatively, the insulating films 2305 and 2306 may be formed using plasma treatment as described above. For example, by oxidizing or nitriding the surface of the semiconductor substrate 2300 by high-density plasma treatment, silicon oxide ($SiO_x$) films or silicon nitride ($SiN_x$) films, which are to be used as the insulating films 2305 and 2306, may be formed over the element formation regions 2302 and 2303.

Next, as shown in FIG. 9C, a conductive film is formed so as to cover the insulating films 2305 and 2306. In this embodiment, an example is shown in which conductive films 2307 and 2308 are sequentially stacked to be used as the conductive film. The conductive film may be a single layer of the conductive film or a stacked layer of three or more conductive films.

As the conductive films 2307 and 2308, tantalum (Ta), tungsten (W), titanium (Ti), molybdenum (Mo), aluminum (Al), copper (Cu), chromium (Cr), niobium (Nb), or the like may be used. In addition to the above-described metal, an alloy containing the above-described metal as the main component or a compound containing the above-described metal may be used for the conductive films 2307 and 2308. Alternatively, the conductive films 2307 and 2308 may be formed by using a semiconductor such as polycrystalline silicon doped with an impurity element such as phosphorus which imparts conductivity to a semiconductor film. In this embodiment, the conductive films 2307 and 2308 are formed of tantalum nitride and tungsten, respectively.

Next, as shown in FIG. 10A, by processing (patterning) the stacked layer of the conductive films 2307 and 2308 into a predetermined shape, gate electrodes 2309 and 2310 are formed over the insulating films 2305 and 2306.

Next, as shown in FIG. 10B, a mask 2311 is selectively formed by using a resist so as to cover the element formation region 2302. Then, an impurity element is introduced to the element formation region 2303. Since the gate electrode 2310 as well as the mask 2311 functions as a mask, by introducing the above-described impurity element, an impurity region 2312, which functions as a source region or a drain region, and a channel formation region 2313 are formed in the p-well 2304. As the impurity element, an impurity element imparting n-type conductivity or an impurity element imparting p-type conductivity is used. As the impurity element imparting n-type conductivity, phosphorus (P), arsenic (As), or the like may be used. As the impurity element imparting p-type conductivity, boron (B), aluminum (Al), gallium (Ga), or the like may be used. In this embodiment, phosphorus (P) is used as the impurity element.

After the mask 2311 is removed, as shown in FIG. 10C, a mask 2314 is selectively formed by using a resist so as to cover the element formation region 2303. Then, an impurity element is introduced to the element formation region 2302. Since the gate electrode 2309 as well as the mask 2314 functions as a mask, by introducing the above-described impurity element, an impurity region 2315, which functions as a source region or a drain region, and a channel formation region 2316 are formed in the semiconductor substrate 2300 in the element formation region 2302. As the impurity element, an impurity element imparting n-type conductivity or an impurity element imparting p-type conductivity is used. As the impurity element imparting n-type conductivity, phosphorus (P), arsenic (As), or the like may be used. As the impurity element imparting p-type conductivity, boron (B), aluminum (Al), gallium (Ga), or the like may be used. In this embodiment, an impurity element having a different conductivity type (for example, boron (B)) from that of an impurity element introduced to the element formation region 2303 in FIG. 10C is introduced.

Next, as shown in FIG. 11A, an insulating film 2317 is formed so as to cover the insulating films 2305 and 2306, and the gate electrodes 2309 and 2310. Then, contact holes are formed in the insulating film 2317 to partially expose impurity regions 2312 and 2315. Next, conductive films 2318 which are connected to the impurity regions 2312 and 2315 through the contact holes are formed. The conductive films 2318 may be formed by a CVD method, a sputtering method, or the like.

The insulating film 2317 may be formed of an inorganic insulating film, an organic resin film, a siloxane-based insulating film, or the like. As the inorganic insulating film, a film containing silicon oxide, silicon oxynitride, silicon nitride oxide, carbon typified by DLC (diamond like carbon), or the like may be used. As the organic resin film, for example, acrylic, epoxy, polyimide, polyamide, polyvinyl phenol, benzocyclobutene, or the like may be used. In addition, the insulating film 2317 may be formed by a CVD method, a sputtering method, a droplet discharging method, a printing method, or the like depending on the material to be used.

Note that a structure of a transistor used for the semiconductor device of the present invention is not limited to the structure illustrated in this embodiment. For example, an inversely staggered structure may be employed.

Next, as shown in FIG. 11B, an interlayer film 2324 is formed. Then, a contact hole is formed by etching the interlayer film 2324 to partially expose the conductive film 2318. The interlayer film 2324 is not limited to a resin and may be other films such as a CVD oxidized film. However, considering surface smoothness, a resin is preferable. Moreover, the contact hole may be formed by using a photosensitive resin without etching. Next, a wiring 2325 which is in contact with the conductive film 2318 through the contact hole, is formed over the interlayer film 2324.

Next, a conductive film 2326 which functions as an antenna is formed so as to be in contact with the wiring 2325. For formation of the conductive film 2326, a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni) may be used. In addition to the above-described metals, an alloy containing the above-described metal as the main component or a compound containing the above-described metal may be used for the conductive film 2326. The conductive film 2326 may be either a single layer the above-described film or a stacked layer of a plurality of the above-described films.

The wiring 2326 may be formed by a CVD method, a sputtering method, a printing method such as screen printing and gravure printing, a droplet discharging method, a dispensing method, a plating method, a photolithography method, a vapor deposition method, or the like.

Although this embodiment shows an example in which an antenna and a semiconductor element are formed over the same substrate, the present invention is not limited thereto. After a semiconductor element is formed, an antenna which is formed separately may be electrically connected to a signal processing circuit. In that case, the antenna and the signal processing circuit are electrically connected to each other by pressure bonding with an anisotropic conductive film (ACF) or an anisotropic conductive paste (ACP). Alternatively, conductive adhesive such as silver paste, copper paste, or carbon paste, a solder joint, or the like can be used for connection.

By employing the above-described manufacturing method, the semiconductor device of the present invention can have a structure in which a transistor is formed on the semiconductor substrate so that a thin-film secondary battery is provided on the semiconductor substrate. By employing the above-described structure, an ultra thin and downsized semiconductor device can be provided.

Note that this embodiment may be combined with the above-described embodiment mode or the other embodiments.

The present application is based on Japanese Priority Patent Application No. 2006-330177 filed on Dec. 7, 2006 with the Japan Patent Office, the entire contents of which are hereby incorporated by reference.

What is claimed is:

1. A semiconductor device comprising:
an SRAM;
a central processing unit being configured to read data from the SRAM;
a wireless power storage unit including an antenna circuit, the wireless power storage unit being configured to store electricity generated from a signal received by the antenna circuit; and
a power supply circuit being configured to supply a power supply voltage generated from the signal received by the antenna circuit to the central processing unit,
wherein the SRAM is configured to store the data by using the electricity stored in the wireless power storage unit.

2. The semiconductor device according to claim 1, wherein the antenna circuit comprises an antenna and a resonance circuit.

3. The semiconductor device of claim 1, wherein the SRAM is configured to use the electricity stored in the wireless power storage unit to store the data regardless of whether the power supply circuit supplies the power supply voltage.

4. The semiconductor device of claim 3, wherein the SRAM is configured to store program data for the central processing unit.

5. The semiconductor device of claim 4, wherein the SRAM is configured to operate as a ROM.

6. The semiconductor device of claim 3, wherein the antenna circuit is configured to wirelessly receive the electricity for storing in the wireless power storage unit.

7. The semiconductor device of claim 3, wherein the wireless power storage unit is configured to convert the electricity from an AC signal into a DC signal.

8. A semiconductor device comprising:
an SRAM;

a central processing unit being configured to read data from the SRAM;
a wireless power storage unit including a power supply portion, an antenna circuit, and a power storage device, the wireless power storage unit being configured to store electricity generated from a signal received by the antenna circuit; and
a power supply circuit being configured to supply a power supply voltage generated from the signal received by the antenna circuit to the central processing unit,
wherein the power supply portion is configured to convert an AC signal received by the antenna circuit to a DC signal and to control charging and discharging of the power storage device by using the DC signal, and
wherein the SRAM is configured to store the data by using the electricity stored in the wireless power storage unit.

9. The semiconductor device according to claim 8, wherein the power storage device comprises a battery or a capacitor.

10. The semiconductor device according to claim 8, wherein the antenna circuit comprises an antenna and a resonance circuit.

11. A semiconductor device comprising:
an SRAM;
a central processing unit being configured to read data from the SRAM;
a wireless power storage unit including a power supply portion, an antenna circuit, and a power storage device, the wireless power storage unit being configured to store electricity generated from a signal received by the antenna circuit; and
a power supply circuit being configured to supply a power supply voltage generated from the signal received by the antenna circuit to the central processing unit,
wherein the SRAM, the central processing unit, the power supply portion, the antenna circuit, and the power storage device are formed on a substrate, and
wherein the SRAM is configured to store the data by using the electricity stored in the wireless power storage unit.

12. The semiconductor device according to claim 11, wherein the power storage device comprises a battery or a capacitor.

13. The semiconductor device according to claim 11, wherein the substrate is one of a glass substrate, a quartz substrate, a plastic substrate, and a semiconductor substrate.

14. The semiconductor device according to claim 11, wherein the antenna circuit comprises an antenna and a resonance circuit.

15. A semiconductor device comprising:
an analog portion including an antenna circuit, a wireless power storage unit and a power supply circuit; and
a logic portion including a central processing unit and a memory,
wherein the central processing unit is configured to read data from the memory,
wherein the wireless power storage unit is configured to store electricity generated from a signal received by the antenna circuit ,
wherein the power supply circuit is configured to supply a power supply voltage generated from the signal received by the antenna circuit to the central processing unit, and
wherein the memory is configured to store the data by using the electricity stored in the wireless power storage unit.

16. The semiconductor device according to claim 15, wherein the memory is a static random access memory.

17. The semiconductor device according to claim 15, wherein the analog portion further comprises a reset circuit, a clock generation circuit, a demodulation circuit, a modulation circuit, and a power supply management circuit.

18. The semiconductor device according to claim 15, wherein the logic portion further comprises a mask ROM and a controller.

19. The semiconductor device according to claim 15, wherein the antenna circuit comprises an antenna and a resonance circuit.

20. A semiconductor device comprising:
an SRAM;
a logic circuit being configured to read data from the SRAM;
a wireless power storage unit being configured to store electricity generated from a signal received wirelessly; and
a power supply circuit being configured to supply a power supply voltage generated from the signal to the logic circuit,
wherein the SRAM is configured to store the data by using the electricity stored in the wireless power storage unit.

21. The semiconductor device according to claim 20, wherein the wireless power storage unit comprises an antenna circuit.

22. The semiconductor device according to claim 20, wherein the antenna circuit is a coiled antenna.

23. The semiconductor device according to claim 21, wherein the SRAM, the logic circuit, the wireless power storage unit, the power supply circuit, and the antenna circuit are formed on a substrate.

24. The semiconductor device according to claim 20, wherein the signal is received using an electric field or a magnetic field.

25. A semiconductor device comprising:
an SRAM;
a logic circuit being configured to read data from the SRAM;
a wireless power storage unit including a power supply portion and a power storage device, the wireless power storage unit being configured to store electricity generated from a signal received wirelessly; and
a power supply circuit being configured to supply a power supply voltage generated from the signal to the logic circuit,
wherein the power supply portion is configured to convert the signal to a DC signal and to control charging and discharging of the power storage device by using the DC signal, and
wherein the SRAM is configured to store the data by using the electricity stored in the wireless power storage unit.

26. The semiconductor device according to claim 25, wherein the power storage device comprises a battery or a capacitor.

27. The semiconductor device according to claim 25, wherein the wireless power storage unit comprises an antenna circuit.

28. The semiconductor device according to claim 27, wherein the antenna circuit is a coiled antenna.

29. The semiconductor device according to claim 25, wherein the signal is received using an electric field or a magnetic field.

30. A semiconductor device comprising:
an analog portion including a wireless power storage unit and a power supply circuit; and
a logic portion including a logic circuit and a memory,
wherein the logic circuit is configured to read data from the memory, wherein the wireless power storage unit is configured to store electricity generated from a signal received wirelessly, wherein the power supply circuit is configured to supply a power supply voltage generated from the signal to the logic circuit, and wherein the memory is configured to store the data by using the electricity stored in the wireless power storage unit.

31. The semiconductor device according to claim 30, wherein the wireless power storage unit comprises an antenna circuit.

32. The semiconductor device according to claim 31, wherein the antenna circuit is a coiled antenna.

33. The semiconductor device according to claim 30, wherein the signal is received using an electric field or a magnetic field.

34. The semiconductor device according to claim 30, wherein the memory is a static random access memory.

35. The semiconductor device according to claim 30, wherein the analog portion further comprises a reset circuit, a clock generation circuit, a demodulation circuit, a modulation circuit, and a power supply management circuit.

36. The semiconductor device according to claim 30, wherein the logic portion further comprises a mask ROM and a controller.

* * * * *

UNITED STATES PATENT AND TRADEMARK OFFICE
CERTIFICATE OF CORRECTION

PATENT NO. : 8,487,745 B2  Page 1 of 1
APPLICATION NO. : 11/948602
DATED : July 16, 2013
INVENTOR(S) : Munehiro Kozuma and Yoshiyuki Kurokawa It is certified that error appears in the above-identified patent and that said Letters Patent is hereby corrected as shown below:

In the Specification:

Column 1, line 51, replace "inferior" with --interior--;

Column 10, line 25, replace "VI" with --*V1*--;

Column 17, line 59, replace "$1\times10^{15}/cm^3$" with --$1\times10^{19}/cm^3$--;

Column 21, line 46, before "Baking" delete "1o";

In the Claims:

Column 28, line 25, in claim 22 replace "20" with --21--.

Signed and Sealed this
Twenty-sixth Day of November, 2013

Margaret A. Focarino
*Commissioner for Patents of the United States Patent and Trademark Office*